United States Patent
Zhu et al.

(10) Patent No.: US 9,451,558 B2
(45) Date of Patent: Sep. 20, 2016

(54) ADAPTIVE TRANSMIT POWER CONTROL IN A COMMUNICATION NETWORK

(71) Applicant: QUALCOMM Incorporated, San Diego, CA (US)

(72) Inventors: Hao Zhu, Ocala, FL (US); Srinivas Katar, Gainesville, FL (US); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 13/971,112

(22) Filed: Aug. 20, 2013

(65) Prior Publication Data

US 2015/0055563 A1    Feb. 26, 2015

(51) Int. Cl.
*H04W 52/24*    (2009.01)
*H04W 74/08*    (2009.01)
*H04B 3/54*    (2006.01)

(52) U.S. Cl.
CPC ............. *H04W 52/243* (2013.01); *H04B 3/54* (2013.01); *H04B 3/544* (2013.01); *H04W 74/0808* (2013.01); *H04B 2203/5425* (2013.01); *H04B 2203/5445* (2013.01); *Y02B 60/50* (2013.01)

(58) Field of Classification Search
None
See application file for complete search history.

(56) References Cited

U.S. PATENT DOCUMENTS

| 8,054,821 | B2 | 11/2011 | Monier et al. |
|---|---|---|---|
| 2003/0123425 | A1 | 7/2003 | Walton et al. |
| 2007/0060057 | A1 | 3/2007 | Matsuo et al. |
| 2009/0233594 | A1* | 9/2009 | Duschesne .......... H04W 52/247 455/423 |
| 2010/0061317 | A1* | 3/2010 | Gorokhov ........... H04W 52/243 370/329 |
| 2010/0099449 | A1* | 4/2010 | Borran ................ H04W 52/243 455/501 |
| 2010/0248736 | A1* | 9/2010 | Hulkkonen ........... H04W 16/14 455/452.2 |
| 2011/0201277 | A1 | 8/2011 | Eguchi |
| 2012/0289278 | A1 | 11/2012 | Huschke et al. |
| 2012/0307917 | A1 | 12/2012 | Goldhamer |

FOREIGN PATENT DOCUMENTS

WO    2009087953 A1    7/2009

OTHER PUBLICATIONS

Musbah, M. R. S. , "Resource Management in Multicarrier Based Cognitive Radio Systems", PhD Thesis Dissertation Submitted to the Universitat Politecnica de Catalunya (UPC) Jan. 2012 , 215 pages.
"PCT Application No. PCT/US2014/051932 International Search Report", Nov. 7, 2014, 14 pages.

* cited by examiner

*Primary Examiner* — Adnan Baig
(74) *Attorney, Agent, or Firm* — DeLizio Law, PLLC

(57) ABSTRACT

Network devices can be configured to implement adaptive power control functionality in a communication network. A power control requestor of a local communication network can calculate a link margin between a neighbor network device of a neighbor communication network and a local network device associated with a least preferred performance measurement. The power control requestor can transmit a power control message including the link margin to request the neighbor network device to vary the transmit power of the neighbor network device. In response to receiving a power control message, a power control responder can use a link margin indicated in the power control message to evaluate the feasibility of reducing the transmit power of the power control responder. The power control responder can transmit a power control response indicating whether it will vary the transmit power.

51 Claims, 9 Drawing Sheets

FIG. 9 is a block diagram of an electronic device including a mechanism for transmit power control.

ADAPTIVE TRANSMIT POWER CONTROL IN A COMMUNICATION NETWORK

BACKGROUND

Embodiments of the inventive subject matter generally relate to the field of communication networks and, more particularly, to adaptive transmit power control in a communication network.

In many data communication systems, such as wireless communication systems and powerline communication (PLC) systems, the data communication medium can be shared among multiple network devices. Carrier sense multiple access (CSMA) protocols can be employed to minimize interference between network devices in a shared communication medium. In accordance with the CSMA protocols, a transmitting network device can sense the shared communication medium and transmit on the shared communication medium after verifying the absence of other traffic on the shared communication medium. If the channel is occupied, the transmitting network device can defer its transmission until the channel becomes available.

SUMMARY

Various embodiments for adaptive power control in a communication network are disclosed. In one embodiment, a first network device of a local communication network may identify a second network device of the local communication network that is associated with a least preferred performance measurement. The first network device may determine a link margin between the second network device and a neighbor network device of a neighbor communication network based, at least in part, on the least preferred performance measurement of the second network device and a first performance measurement of the neighbor network device. The first network device may determine whether to transmit a power control message to cause the neighbor network device to vary a transmit power of the neighbor network device, based, at least in part, on the link margin.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
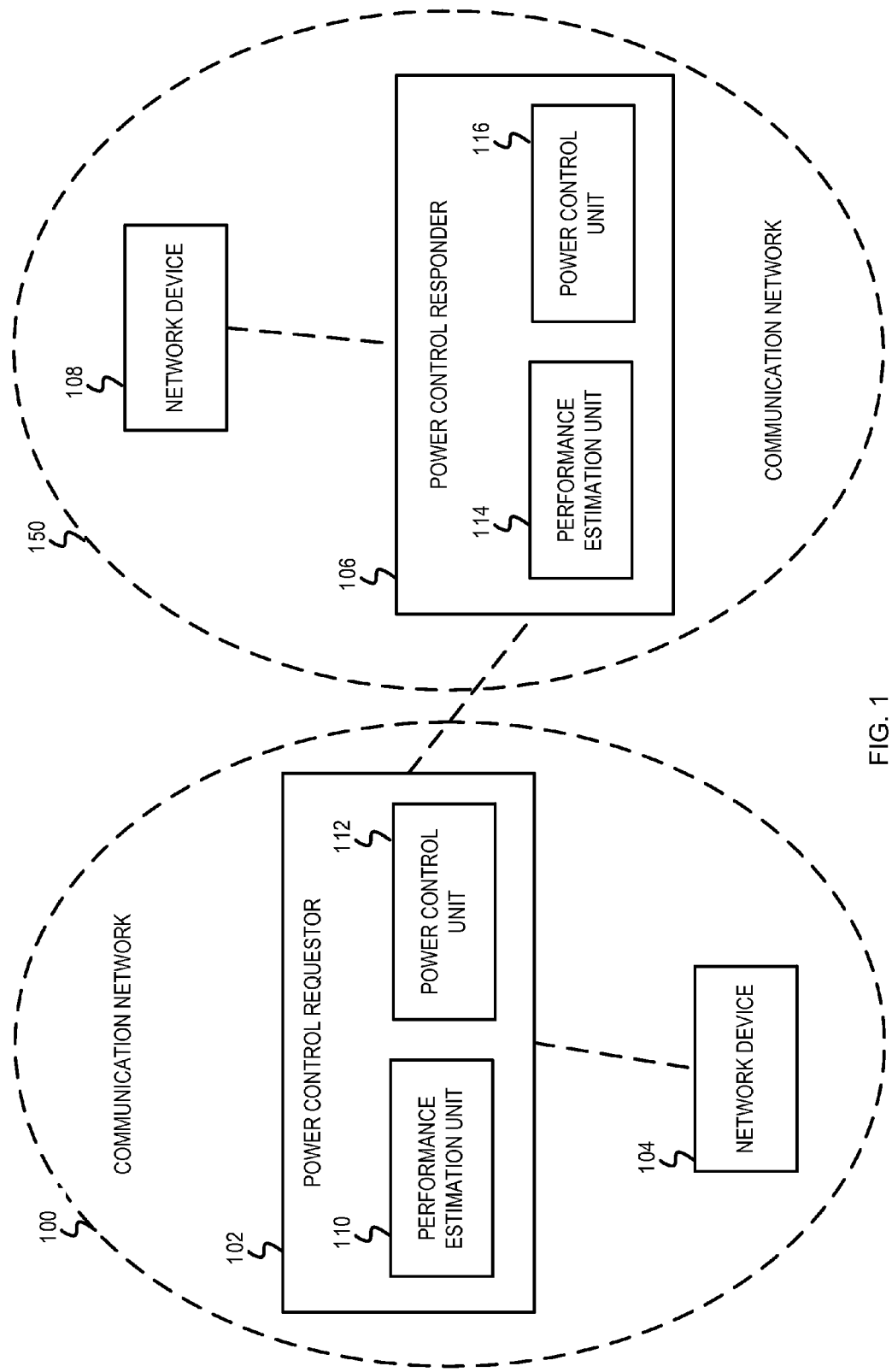
FIG. 1 is a block diagram illustrating transmit power control in neighbor communication networks.

The description that follows includes exemplary systems, methods, techniques, instruction sequences, and computer program products that embody techniques of the present inventive subject matter. However, it is understood that the described embodiments may be practiced without these specific details. For instance, although examples refer to executing adaptive transmit power control operations in a powerline communication (PLC) network, embodiments are not so limited. In other embodiments, the adaptive transmit power control operations can be implemented by network devices in other suitable shared-medium communication networks, such as wireless local area networks (WLAN), Ethernet over Coax (EoC) networks, Multimedia over Coax Alliance (MoCA®) networks, etc. In other instances, well-known instruction instances, protocols, structures, and techniques have not been shown in detail in order not to obfuscate the description.

A self-deployed communication network (e.g., WLAN, PLC network, etc.) typically uses carrier sensing multiple access (CSMA) techniques to minimize interference between network devices sharing a communication medium. Furthermore, the shared communication medium may also host multiple communication networks. For example, multiple PLC networks may share a common powerline medium and a common communication channel. Network devices in a local communication network can determine whether to reuse or share the communication channel with a neighbor communication network based on signal strength levels and/or interference levels detected in the local communication network. To reuse the communication channel, network devices in the local and the neighbor communication networks may simultaneously transmit their respective communications over the same communication channel. To share the communication channel, network devices in the local communication network may defer transmissions when communications of the neighbor communication network are detected, and vice versa. However, robust transmission of certain communications (e.g., preambles and other delimiters) may affect a network device's decision to reuse or share the communication channel. For example, a network device in the local communication network may detect delimiters transmitted from the neighbor communication network, even though the interference level from the neighbor communication network may be tolerable. In response to detecting the delimiter, the network device may incorrectly determine to share the communication channel instead of reusing the communication channel, which can impact the performance of the communication networks. Furthermore, any inconsistencies due to different channel reuse decisions within the local communication network may be resolved by forcing all the network devices in the local communication network to share the communication channel with the neighbor communication network. This can further result in performance degradation in the local and neighbor communication networks.

In some embodiments, if a first network device in a local communication network detects interference from a neighbor network device of a neighbor communication network, the neighbor network device can be notified to reduce its transmit power. In some embodiments, the first network device can determine a link margin between the neighbor network device and a second network device of the local communication network based, at least in part, on performance measurements of the network devices. The first network device can transmit a power control message including the link margin to the neighbor network device. By transmitting the power control message, the first network device can request the neighbor network device to reduce its transmit power, as will be further described in FIGS. 1-5 and 8. The neighbor network device can determine performance measurements for other network devices in the neighbor communication network. The neighbor network device can use the received link margin and the determined performance measurements to evaluate whether to reduce its transmit power, as will be further described in FIGS. 1 and 6-8. The first network device can determine whether to reuse or share the communication channel with the neighbor communication network, depending on whether the neighbor network device can reduce its transmit power. Such an adaptive transmit power control mechanism can help minimize interference between the local and the neighbor communication networks. By allowing the neighbor network device to evaluate whether to reduce its transmit power, the adaptive transmit power control mechanism can ensure that the performance of the neighbor communication network is not compromised. Reducing the transmit power of the neighbor network device may allow the local and neighbor communication networks to reuse the shared communication channel, thus improving aggregate performance of the communication networks.

FIG. 1 is a block diagram illustrating transmit power control in neighbor communication networks 100 and 150. The communication network 100 comprises network devices 102 and 104; and the communication network 150 comprises network devices 106 and 108. The network device 102 comprises a performance estimation unit 110 and a power control unit 112. The network device 106 also comprises a performance estimation unit 114 and a power control unit 116. Although not depicted in FIG. 1, the other network devices 104 and 108 can each comprise a performance estimation unit and a power control unit.

In some implementations, the network devices 102, 104, 106, and/or 108 can each be an electronic device such as a laptop computer, a tablet computer, a mobile phone, a smart appliance, a gaming console, a dedicated/standalone access point, or other suitable electronic devices with various communication capabilities (e.g., WLAN communication capabilities, PLC capabilities, Ethernet communication capabilities, etc.). In some embodiments, each of the network devices 102, 104, 106, and 108 can be a PLC device (e.g., a PLC adaptor module).

The network devices 102, 104, 106, and 108 can each execute transmit power control operations described herein to cause a neighbor network device (in a neighbor communication network) to reduce its transmit power and increase the likelihood of channel reuse between neighbor communication networks 100 and 150. In the example of FIG. 1, the network device 102 requests a neighbor network device to reduce its transmit power and is herein referred to as a "power control requestor." Operations of the power control requestor will further be described below with reference to FIGS. 1-4.

The power control requestor 102 can determine a performance measurement associated with the other network devices in the local communication network 100 ("local network devices") and network devices in a neighbor communication network 150 ("neighbor network devices"). Specifically, for each of the local network devices, the performance estimation unit 110 can determine the performance measurement of a communication link between the power control requestor 102 and a local network device. Likewise, for each of the neighbor network devices, the performance estimation unit 110 can determine the performance measurement of a communication link between the power control requestor 102 and a neighbor network device. For example, the performance estimation unit 110 can determine a signal strength, a signal attenuation, a signal-to-noise ratio (SNR), an error rate, or another suitable performance measurement associated with the local network device 104 and the neighbor network devices 106 and 108. Based on the performance measurement, the power control requestor 102 can then identify a local network device with a least preferred performance measurement. For example, the power control unit 112 can analyze the performance measurements associated with each of the local network devices and determine that the local network device 104 is associated with the least preferred performance measurement. The local network device associated with the least preferred performance measurement is herein referred to as a "weakest local transmitter." For example, the power control unit 112 may determine that a signal transmitted by the local network device 104 has the highest signal attenuation, as compared to other local network devices. As another example, the power control unit 112 may determine that a signal transmitted by the local network device 104 has the lowest signal strength, as compared to other local network devices. In these examples, the power control unit 112 may designate the local network device 104 as the weakest local transmitter.

In some embodiments, the power control requestor 102 can identify a neighbor network device with the highest interference level. For example, the power control unit 112 can analyze the performance measurements associated with each of the neighbor network devices 106 and 108 and determine that the neighbor network device 106 is associated with the highest interference level. For example, the power control unit 112 may determine that a signal transmitted by the neighbor network device 106 has the highest signal strength, as compared to other neighbor network devices. As another example, the power control unit 112 may determine that a signal transmitted by the neighbor network device 106 has the lowest signal attenuation, as compared to other neighbor network devices. In these examples, the power control unit 112 may determine that the neighbor network device 106 presents the strongest interference to the local communication network 100. In some embodiments, the power control requestor 102 may transmit a power control message to cause the neighbor network device 106 with the highest interference level to reduce its transmit power. In other embodiments, the power control requestor 102 may transmit a power control message to multiple neighbor network devices. For example, the power control requestor 102 may transmit a power control message to each neighbor network device associated with a signal strength that a greater than a signal threshold (or a signal attenuation that is less than an attenuation threshold).

To evaluate whether to transmit a power control message to the neighbor network device 106, the power control requestor 102 can determine a link margin between the weakest local transmitter 104 and the neighbor network device 106 based on the performance measurement of the neighbor network device and the performance measurement of the weakest local transmitter 104. For example, the power control unit 112 can determine a link margin based on a signal attenuation of the weakest local transmitter 104 (determined at the power control requestor 102) and based on signal attenuation of the neighbor network device 106 (determined at the power control requestor 102).

As will be further described below in FIGS. 2-4, the power control requestor 102 can use the link margin between the weakest local transmitter 104 and the neighbor network device 106 to evaluate whether to transmit the power control message to the neighbor network device 106. The power control message can include the calculated the link margin and an identifier of the weakest local transmitter 104. The power control message can be a request to the neighbor network device 106 to reduce the transmit power of the neighbor network device 106.

The network device 106 can receive the power control message from the power control requestor 102 and can execute feasibility operations to determine whether to reduce its transmit power. The network device that receives the power control message and executes the feasibility operations is herein referred to as a "power control responder." In the example of FIG. 1, the power control unit 116 of the power control responder 106 can use the link margin received in the power control message to determine whether to vary the transmit power of the power control responder 106.

The power control responder 106 can identify (from its local communication network 150) a network device associated with the least preferred performance measurement. The performance estimation unit 114 can determine a performance measurement between the power control responder 106 and each local network device 108 in the local communication network 150. The power control unit 116 can compare the performance measurement associated with each of the local network devices and can determine that the network device 108 is associated with the least preferred performance measurement. For example, the power control unit 116 can identify the local network device 108 that is associated with the highest signal attenuation, the lowest signal strength, the lowest SNR, the highest error rate, etc. The power control unit 116 can determine a performance measurement between: A) the network device 108 with the least preferred performance measurement in the communication network 150, as determined by the power control responder 106 and B) the network device 104 with the least preferred performance measurement in the communication network 100, as determined by the power control requestor 102. This performance measurement can be a signal strength, a signal attenuation, SNR, or another suitable performance measurement. The power control unit 116 can use the link margin (received in the power control message) and the performance measurement between the network devices 104 and 108 to determine whether reducing the transmit power will negatively affect the performance of the network devices in the communication network 150 of the power control responder. If the power control unit 116 determines not to vary the transmit power of the power control responder 106, the power control responder 106 can transmit subsequent communications at a normal/high transmit power. The power control responder 106 can transmit an acknowledgement (ACK) message or a negative acknowledgment (NACK) message to indicate whether the power control responder 106 will vary its transmit power. Depending on whether the power control responder 106 can reduce its transmit power, the power control requestor 102 can determine whether to reuse or share the communication channel between the communication networks 100 and 150. Operations of the power control responder 106 will be described in further detail with reference to FIGS. 6 and 7.

Although FIG. 1 describes the network device 102 of the communication network 100 operating as a power control requestor and the network device 106 of the communication network 150 operating as the power control responder, embodiments are not so limited. Each of the network devices 102, 104, 106, and 108 can operate as both the power control requestor (if the network device detects a high interference level from the neighbor communication network) and the power control responder (if the network device receives a request to vary its transmit power). Each of the network devices 102, 104, 106, and 108 can execute the adaptive transmit power control operations described herein so that the aggregate system performance (e.g., a combined performance of the communication networks 100 and 150) can be optimized by maximizing the extent of channel reuse among the communication networks 100 and 150.

Figure 2:
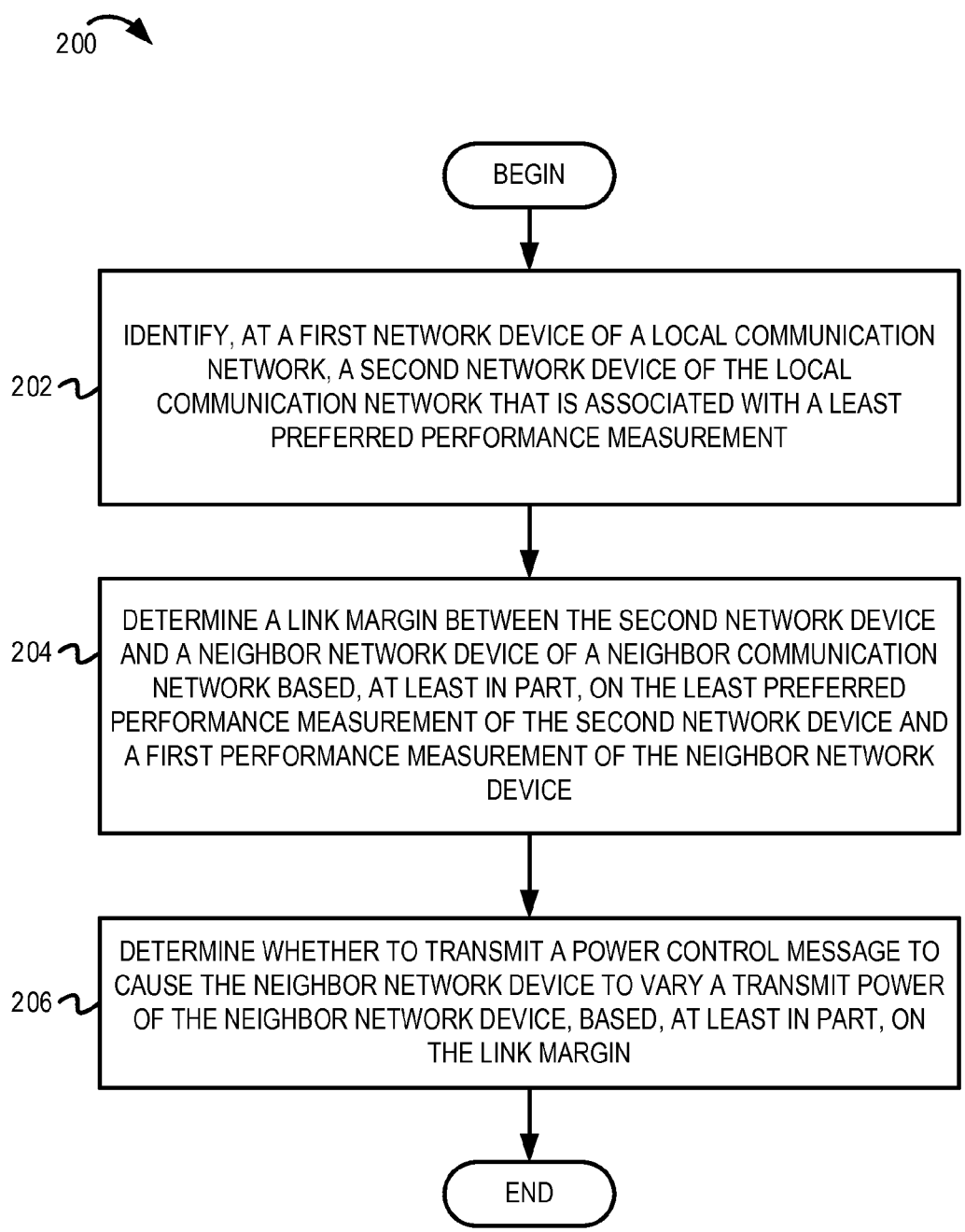
FIG. 2 is a flow diagram illustrating example operations of a power control requestor.

FIG. 2 is a flow diagram ("flow") 200 illustrating example transmit power control operations of a power control requestor. The flow 200 begins at block 202.

At block 202, a first network device of a local communication network identifies a second network device in the local communication network that is associated with a least preferred performance measurement. With reference to the example of FIG. 1, for each of the local network devices, the performance estimation unit 110 can determine a performance measurement of a communication link between the first network device 102 and the local network device. For example, the performance estimation unit 110 can determine the signal attenuation of the signals received at the power control requestor 102 from each of the local network devices. The power control unit 112 can identify the local network device 104 that is associated with the lowest signal attenuation. The power control unit 112 can analyze any suitable performance measurements (e.g., signal strength, SNR, error rate, etc.) for the local network devices and can select the local network device 104 associated with the least preferred performance measurement. The flow continues at block 204.

At block 204, the first network device determines a link margin between the second network device and a neighbor network device of a neighbor communication network based, at least in part, on the least preferred performance measurement of the second network device and a first performance measurement of the neighbor network device. For example, the power control unit 112 may analyze a performance measurement of the neighbor network device 106 to determine whether to transmit a power control message to the neighbor network device 106. As will be further described below with reference to FIGS. 3 and 4, the power control unit 112 can calculate the link margin between the neighbor network device 106 and the local network device 104 associated with least preferred performance measurement. The flow continues at block 206.

At block 206, the first network device determines whether to transmit the power control message to cause the neighbor network device to vary a transmit power of the neighbor network device, based, at least in part, on the link margin. As will be further described with reference to FIGS. 3 and 4, the power control unit 112 can determine whether the neighbor network device 106 (of the neighbor communication network 150) should reduce the transmit power of the neighbor network device 106. The power control unit 112 can also determine a power level by which the neighbor network device 106 should reduce its transmit power. If the power control unit 112 determines that the neighbor network device should reduce its transmit power, the power control unit 112 transmits the power control message to the neighbor network device 106. The power control message can include the link margin (determined at block 204) and an identifier of the local network device 104 associated with least preferred performance measurement. Depending on whether the power control responder 106 can reduce its transmit power, the power control requestor 102 can determine whether to reuse or share the communication channel between the local communication network 100 and the neighbor communication network 150. From block 206, the flow ends.

Figure 3:
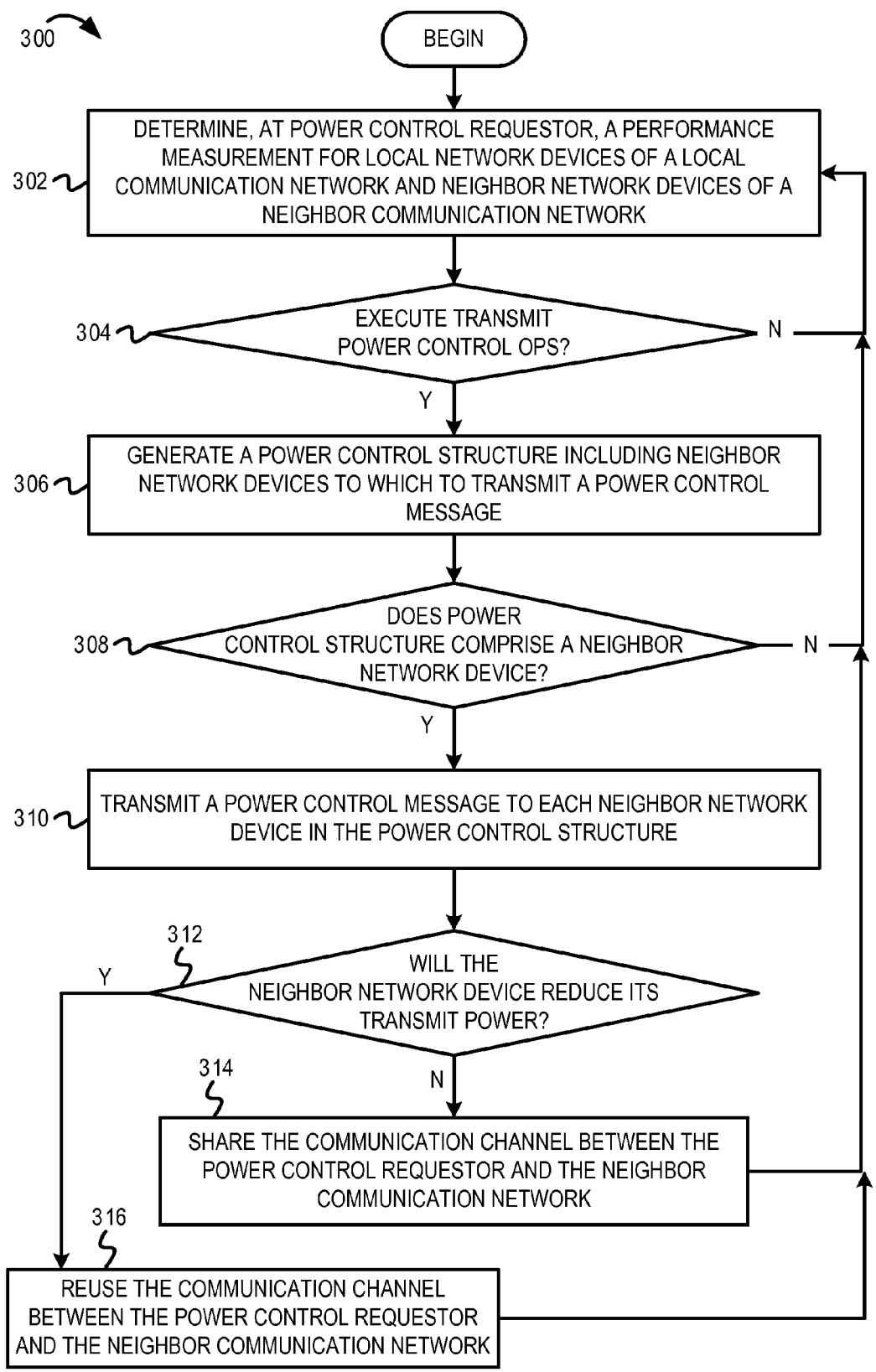
FIG. 3 is a flow diagram illustrating example transmit power control operations of a power control requestor.

FIG. 3 is a flow diagram 300 illustrating example transmit power control operations of a power control requestor. The flow 300 begins at block 302.

At block 302, a performance measurement is determined for local network devices within a local communication network and neighbor network devices of a neighbor communication network. With reference to the example of FIG. 1, for each local network device, the performance estimation unit 110 of the power control requestor 102 can determine a performance measurement of a communication link between the power control requestor 102 and the local network device. Likewise, for each neighbor network device 106, 108, the performance estimation unit 110 can determine a performance measurement of a communication link between the power control requestor 102 and the neighbor network device. The performance estimation unit 110 may continuously (or periodically) determine a performance measurement for each local network device 104 in the local communication network 100 based on received and/or overheard messages transmitted by the local network device. Likewise, the performance estimation unit 110 may continuously (or periodically) determine a performance measurement for each neighbor network device 106, 108 in the neighbor communication network 150, based on received and/or overheard messages transmitted by the neighbor network device. In some embodiments, the performance estimation unit 110 can use received delimiters (e.g., start of frame delimiter, ACK delimiters, etc.) to determine the performance measurement associated with the network devices 104, 106, and 108. In other embodiments, the performance estimation unit 110 can use other suitable received messages or portions of received messages to determine the performance measurement associated with the network devices 104, 106, and 108. The performance measurement can include a signal strength, a signal attenuation, an error rate, a SNR, and/or other suitable performance indicators.

In some embodiments, the performance estimation unit 110 can also determine identifying information and communication capabilities of the network devices 104, 106, and 108. For example, the performance estimation unit 110 can analyze messages transmitted by the network devices 104, 106, 108 to determine a device identifier of the transmitting network device and a network to which the transmitting network device belongs. The performance estimation unit 110 can use the messages transmitted by the network devices 104, 106, 108 to determine communication parameters of the transmitting network device, such as transmission data rate, transmission feedback, etc. In some embodiments, the performance estimation unit 110 can determine the signal strength associated with the network devices 104, 106, and 108. For example, a receiver amplifier of the power control requestor 102 may comprise a gain controller (e.g., an automatic gain control (AGC) unit) to amplify the received signal and minimize the quantization noise at a subsequent analog-to-digital converter (ADC). Once the appropriate gain setting for receiving the signal is selected, the power control requestor 102 typically uses the selected gain setting for receiving the remainder of the received signal. The power control requestor 102 can use the selected gain setting to infer the signal strength or the signal attenuation of the transmitting network device. For example, a high gain setting can indicate a high signal attenuation from the transmitting network device 104 to the receiving power control requestor 102. It is noted that other suitable techniques may be used to infer the signal strength (or signal attenuation) of a received signal based on signal energy of a preamble (or other suitable data fields). The flow continues at block 304.

At block 304, it is determined whether to execute transmit power control operations. In some embodiments, the power control unit 112 of the power control requestor 102 can execute the transmit power control operations at regular intervals. The power control unit 112 can determine whether a predetermined time interval has elapsed. If so, the power control unit 112 can execute the transmit power control operations. In other embodiments, the power control unit 112 can execute the transmit power control operations in response to a notification from another processing unit, a user input, etc. In other embodiments, the power control unit 112 can execute the transmit power control operations in response to detecting a neighbor network device with a high interference level. If it is determined to execute the power control operations, the flow continues at block 306. Otherwise, the flow loops back to block 302 where the power control requestor 102 continues to determine a performance measurement for the local network devices and the neighbor network devices.

At block 306, a power control structure is generated. The power control structure can include a listing of neighbor network devices to which a power control message should be transmitted. For example, if the power control unit 112 determines to transmit a power control message to the neighbor network device 106, information associated with the neighbor network device 106 can be stored in the power control structure. The power control structure can include an entry for each neighbor network device to which the power control message should be transmitted. Each entry in the power control structure can include an identifier of the neighbor network device and a performance measurement associated with the neighbor network device. The performance measurement associated with the neighbor network device can be a performance measurement of a communication link between the neighbor network device and the power control requestor 102. The performance measurement can include a signal strength, a signal attenuation, an error rate, a signal-to-noise ratio, and/or another suitable performance measurement. In some embodiments, the power control requestor 102 can record an identifier of the local network device 104 with the least preferred performance measurement (i.e., the weakest local transmitter) and a corresponding performance measurement of the weakest local transmitter 104. For example, the power control requestor 102 can record the received signal strength indicator (RSSI) and the identifier of the network device 104 associated with the lowest RSSI. As another example, the power control requestor 102 can record the signal attenuation and the identifier of the network device 104 associated with the highest measured signal attenuation. As another example, the power control requestor 102 can record an error rate, SNR, and/or another suitable performance measurement of a communication link between the weakest local transmitter and the power control requestor 102.

The power control unit 112 can use different techniques to identify a neighbor network device to which the power control message should be transmitted. In general, the power control unit 112 can identify neighbor network devices whose communications cause interference in the local communication network 100. In some embodiments, the power control unit 112 may identify the neighbor network device that transmitted signals with the highest interference level. For example, the power control unit 112 may identify the neighbor network device 106 that transmitted signals with the highest signal strength (detected at the power control requestor 102) or the lowest signal attenuation (detected at the power control requestor 102). The power control unit 112 can execute operations further described in FIG. 4 to determine whether to transmit the power control message to the neighbor network device.

In other embodiments, the power control unit 112 may identify multiple neighbor network devices that may interfere with communications in the local communication network 100. For example, the power control unit 112 may identify N neighbor network devices associated with the highest detected signal strength (or lowest detected signal attenuation). For each of the identified N neighbor network devices, the power control unit 112 can execute operations further described in FIG. 4 to determine whether to transmit the power control message to the neighbor network device. In other embodiments, the power control unit 112 may compare a performance measurement of the neighbor network device 106 against a corresponding performance threshold. The performance measurement can be signal strength, signal attenuation, SNR, error rate, or another suitable performance measurement. If the performance measurement of the neighbor network device is not in accordance with the corresponding performance threshold, the power control unit 112 can determine to transmit the power control message to the neighbor network device. For example, if the signal strength associated with the neighbor network device 106 exceeds a threshold signal strength, the power control unit 112 may determine to transmit the power control message to the neighbor network device 106. As another example, if the signal attenuation associated with the neighbor network device 106 is lower than a threshold attenuation, the power control unit 112 can determine to transmit the power control message to the neighbor network device 106. In some embodiments, as will be further discussed in FIG. 4, in determining whether to transmit the power control message to the neighbor network device, the power control unit 112 can calculate a link margin using a performance measurement of the weakest local transmitter and a performance measurement of the neighbor network device. In some embodiments, as will be further described in FIG. 4, the power control unit 112 can determine whether to transmit a power control message to a neighbor network device depending on whether the neighbor network device previously reduced its transmit power. The flow continues at block 308.

At block 308, it is determined whether the power control structure comprises a neighbor network device. The power control unit 112 can determine whether the power control structure indicates at least one neighbor network device to which the power control message should be transmitted. If the power control structure comprises a neighbor network device to which the power control message should be transmitted, the flow continues at block 310. Otherwise, the flow loops back to block 302 where the power control requestor 102 continues to determine performance measurements associated with the local network devices and the neighbor network devices.

At block 310, a power control message is transmitted to the neighbor network devices in the power control structure. For example, the power control unit 112 can transmit a power control message to each neighbor network device identified in the power control structure. In some embodiments, the power control unit 112 can transmit the power control message to the neighbor network device 106 associated with the highest interference level. For example, the power control unit 112 can transmit the power control message to the neighbor network device 106 associated with the highest detected signal strength, the lowest detected signal attenuation, etc. In another embodiment, the power control unit 112 can transmit the power control message to multiple neighbor network devices. The performance measurement of each of the neighbor network devices may be compared against a performance threshold to identify multiple neighbor network devices to which the power control message should be transmitted. For example, the power control unit 112 can transmit the power control message to multiple neighbor network devices associated with a signal strength that is greater than a signal strength threshold. As another example, the power control unit 112 can transmit the power control message to multiple neighbor network devices associated with a signal attenuation that is lower than an attenuation threshold. The power control message can include an identifier of the weakest local transmitter and a link margin between the weakest local transmitter 104 and the neighbor network device 106. In one example, the link margin can be calculated as a difference between a first signal attenuation associated with the neighbor network device 106 and a second signal attenuation associated with the weakest local transmitter 104. In this example, the first signal attenuation can be the signal attenuation of a communication link between the power control requestor 102 and the neighbor network device 106. The second signal attenuation can be the signal attenuation of a communication link between the power control requestor 102 and the weakest local transmitter 104. The flow continues at block 312.

At block 312, it is determined whether the neighbor network device will reduce its transmit power. As will be further described with reference to FIG. 6-7, after transmitting the power control message to the neighbor network device 106, the neighbor network device 106 can execute feasibility operations and determine whether to reduce its transmit power. After transmitting the power control message to the neighbor network device 106, the power control requestor 102 can determine whether an acknowledgement (ACK) message or a negative acknowledgement (NACK) message was received from the neighbor network device 106. If a NACK message is received from the neighbor network device 106, the power control unit 112 can infer that the neighbor network device 106 will not reduce its transmit power. Consequently, flow continues at block 314. If an ACK message is received from the neighbor network device 106, the power control unit 112 can infer that the neighbor network device 106 will reduce its transmit power and the flow continues at block 316.

At block 314, it is determined to share the communication channel with the neighbor network device. The flow 300 moves from block 312 to block 314 if the power control requestor 102 determines that the neighbor network device 106 will not reduce its transmit power. In some embodiments, in response to determining that the neighbor network device 106 will not reduce its transmit power, the power control unit 112 can maintain its current transmit power. The power control unit 112 may also notify other local network devices 104 of the local communication network 100 to maintain their respective current transmit power. In another embodiment, in response to determining that the neighbor network device 106 will not reduce its transmit power, the power control unit 112 can transmit subsequent messages at a maximum transmit power. The power control unit 112 may also notify other local network devices 104 of the local communication network 100 to transmit subsequent messages at their respective maximum transmit power. Furthermore, in response to determining that the neighbor network device 106 will not reduce its transmit power, the power control unit 112 may determine to share the communication channel with the neighbor network devices 106 and 108. The power control unit 112 may also notify the other local network devices 104 to share the communication channel with the neighbor network devices 106 and 108. For example, the network devices 102 and 104 in the local communication network 100 may defer their transmissions in response to detecting communications of the neighbor network devices 106 and 108. From block 314, the flow loops back to block 302 where the power control requestor 102 continues to determine performance measurements associated with the local network devices and the neighbor network devices.

At block 316, it is determined to reuse the communication channel with the neighbor network device. The flow 300 moves from block 312 to block 316 if the power control unit 112 determines that the neighbor network device 106 will reduce its transmit power. In response to determining that the neighbor network device 106 will reduce its transmit power, the power control unit 112 may determine to reuse the communication channel with the neighbor network devices 106 and 108. The power control unit 112 may also notify the other local network devices 104 of its channel reuse decision to reuse the communication channel with the neighbor network devices 106 and 108. In some embodiments, the channel reuse decision of the power control requestor 102 may be compared against channel reuse decisions of other local network device 104 to resolve conflicting channel reuse decisions and to determine a coordinated network-wide channel reuse decision. From block 316, the flow loops back to block 302 where the power control requestor 102 continues to determine performance measurements associated with the local network devices and the neighbor network devices.

Figure 4:
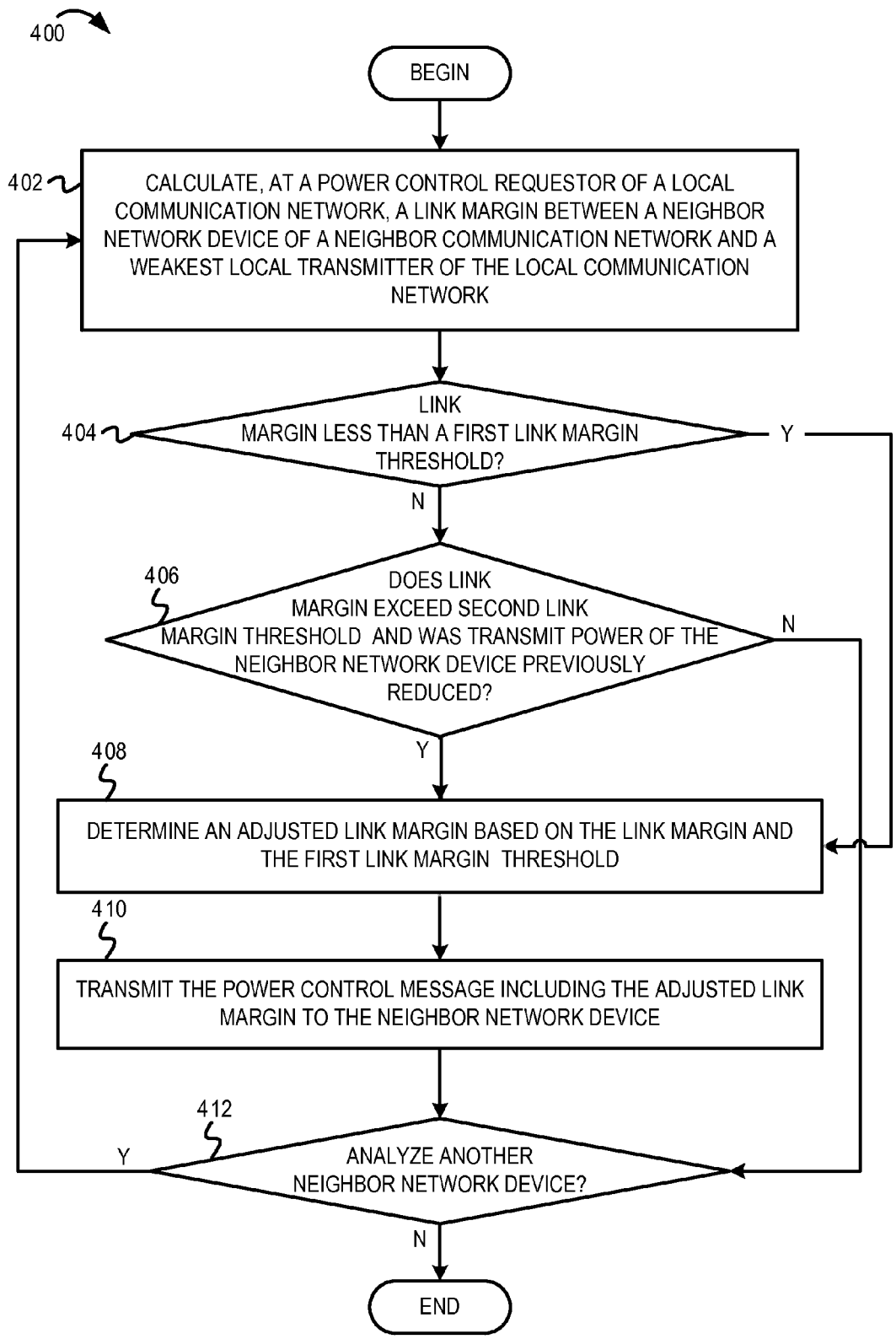
FIG. 4 is a flow diagram illustrating example operations for determining whether to transmit a power control message to a neighbor network device.

FIG. 4 is a flow diagram 400 illustrating example operations for determining whether to transmit a power control message to a neighbor network device. The flow 400 begins at block 402.

At block 402, a link margin between a neighbor network device of a neighbor communication network and a weakest local transmitter of a local communication network is calculated at a power control requestor of the local communication network. With reference to the example of FIG. 1, the power control requestor 102 is part of the local communication network 100, while the neighbor network device 106 is part of the neighbor communication network 150. As described above with reference to block 302 of FIG. 3, the power control unit 112 of the power control requestor 102 identifies a weakest local transmitter 104 that is associated with a least preferred performance measurement. For example, the performance estimation unit 110 can determine a signal attenuation (LA_Attn) associated with a weakest local transmitter 104. If the neighbor network device 106 is the $n^{th}$ neighbor network device being evaluated, the performance estimation unit 110 can determine a signal attenuation (NA_Attn[n]) associated with the neighbor network device 106, as described above in block 302 of FIG. 3. The power control unit 112 can calculate a link margin M[n] for the $n^{th}$ neighbor network device in accordance with Eq. 1. The flow continues at block 404.

$$M[n]=NA\_Attn[n]-LA\_Attn \qquad \text{Eq. 1}$$

At block 404, it is determined whether the link margin is less than a first link margin threshold. With reference to the example of FIG. 1, the power control unit 112 can compare the link margin M[n] associated with the $n^{th}$ neighbor network device against the first link margin threshold (threshold_1). In some embodiments, the first link margin threshold can be determined based on carrier sense multiple access (CSMA) communication protocols. The first link margin threshold may be predetermined or may be dynamically determined by the power control unit 112. The first link margin threshold can be used to determine whether the available link margin M[n] between the weakest local transmitter 104 and the $n^{th}$ neighbor network device 106 is too small. If the link margin determined for the neighbor network device 106 is less than the first link margin threshold, the flow continues at block 408, where a corrected link margin is calculated. Otherwise, if the link margin exceeds the first link margin threshold, the flow continues at block 406. In some embodiments, the power control unit 112 may determine that the M[n]<threshold_1 condition is satisfied if the link margin M[n] is equal to the first link margin threshold and the flow may continue at block 406. In other embodiments, however, the power control requestor 102 may determine that the M[n]<threshold_1 condition is not satisfied if the link margin M[n] is equal to the first link margin threshold and the flow may continue at block 408.

At block 406, it is determined whether the link margin exceeds a second link margin threshold and whether the transmit power of the neighbor network device was previously reduced. With reference to FIG. 1, the power control unit 112 can compare the link margin M[n] associated with the $n^{th}$ neighbor network device against the second link margin threshold (threshold_2). In some embodiments, the second link margin threshold can be determined based on carrier sense multiple access (CSMA) communication protocols. The second link margin threshold may be predetermined or may be dynamically determined by the power control unit 112. The first link margin threshold and the second link margin threshold can be selected to optimize the performance of the overall communication system (e.g., the combination of the local communication network 100 and the neighbor communication network 150). Typically, the magnitude of the second link margin threshold is greater than the magnitude of the first link margin threshold (i.e., threshold_2>threshold_1). In some embodiments, the power control requestor 102 may determine that the M[n]>threshold_2 condition is satisfied if the link margin M[n] is equal to the second link margin threshold. In other embodiments, however, the power control requestor 102 may determine that the M[n]>threshold_2 condition is not satisfied if the link margin M[n] is equal to the second link margin threshold.

By checking whether both conditions indicated in block 406 are satisfied, the power control unit 112 can ensure that the neighbor network device 106 does not reduce its transmit power at multiple iterations of the transmit power control operations. Because of the dynamic nature of the shared communication channel, the power control unit 112 may try to ensure that the neighbor network device 106 reduces its transmit power by the minimum amount needed for channel reuse between the communication networks 100 and 150.

For example, during a first iteration of the transmit power control operations, the power control unit 112 may prompt the neighbor network device 106 to reduce the transmit power of the neighbor network device 106. During a subsequent iteration, the power control unit 112 may determine that the neighbor network device 106 need not maintain the reduced transmit power (e.g., because of a change in channel conditions). In some embodiments, if the link margin between the weakest local transmitter 104 and the neighbor network device 106 is high (e.g., greater than the second link margin threshold), then the neighbor network device 106 may be permitted to increase its previously reduced transmit power. If the link margin is greater than the second link margin threshold and if the transmit power of the neighbor network device was previously reduced, the flow continues at block 408. If one or both the conditions are not satisfied, the flow continues at block 412, where the power control unit 112 determines whether to analyze another neighbor network device.

At block 408, an adjusted link margin is determined based on the link margin and the first link margin threshold. The power control unit 112 can determine the adjusted link margin by subtracting the first link margin threshold (threshold_1) from the link margin (M[n]) associated with the $n^{th}$ neighbor network device (previously determined at bock 404). For example, the power control unit 112 can calculate the adjusted link margin in accordance with Eq. 2. In other embodiments, the power control unit 112 can determine the adjusted link margin based, at least in part, on a suitable combination of the link margin and the first link margin threshold. The flow continues at block 410.

$$M[n]=M[n]-threshold\_1 \qquad \text{Eq. 2}$$

At block 410, the power control message is transmitted to the neighbor network device. The power control message can include the adjusted link margin (determined at block 408), an identifier of the weakest local transmitter, and an identifier of the neighbor network device. The adjusted link margin can indicate by how much the neighbor network device 106 should vary its transmit power. The sign of the adjusted link margin (e.g., whether the adjusted link margin is a positive value or a negative value) can indicate whether the neighbor network device 106 should increase or decrease its transmit power. For example, the power control unit 112 may request the neighbor network device 106 to reduce its transmit power if the adjusted link margin is a negative value. The power control unit 112 may request the neighbor network device 106 to increase its transmit power if the adjusted link margin is a positive value. The flow continues at block 412.

At block 412, it is determined whether to analyze another neighbor network device. For example, the power control unit 112 can determine whether a power control structure (determined in FIG. 3) comprises another neighbor network device to evaluate. If the power control unit 112 determines to analyze another neighbor network device, the flow loops back to block 402. Otherwise, the flow ends.

In some embodiments, each network device can adjust the first link margin threshold (threshold_1) and the second link margin threshold (threshold_2), according to various design considerations. For example, if the noise level detected at the network device 102 is high, the network device 102 may decrease the first link margin threshold to allow for a higher interference level. As another example, if the rate of incoming traffic is low, the network device 102 may decrease the first link margin threshold to tolerate a higher interference level without loss of throughput. As another example, if the network device 102 is scheduled to transmit traffic with stringent quality of service (QoS) requirements, the network device 102 may increase the first link margin threshold to improve its link performance by reducing the interference level. It is noted that after the network device 102 varies the first link margin threshold, the network device 102 can use this updated first link margin threshold for subsequent operations executed by the network device 102.

In some embodiments, as described above in FIGS. 3 and 4, the power control requestor 102 can directly transmit the power control message to each of the neighbor network devices in the power control structure. In other embodiments, however, the power control requestor 102 can transmit the power control message to the requisite neighbor network devices via a central coordinator of the local communication network 100 and/or a central coordinator of the neighbor communication network 150, as described with reference to FIG. 5.

Figure 5:
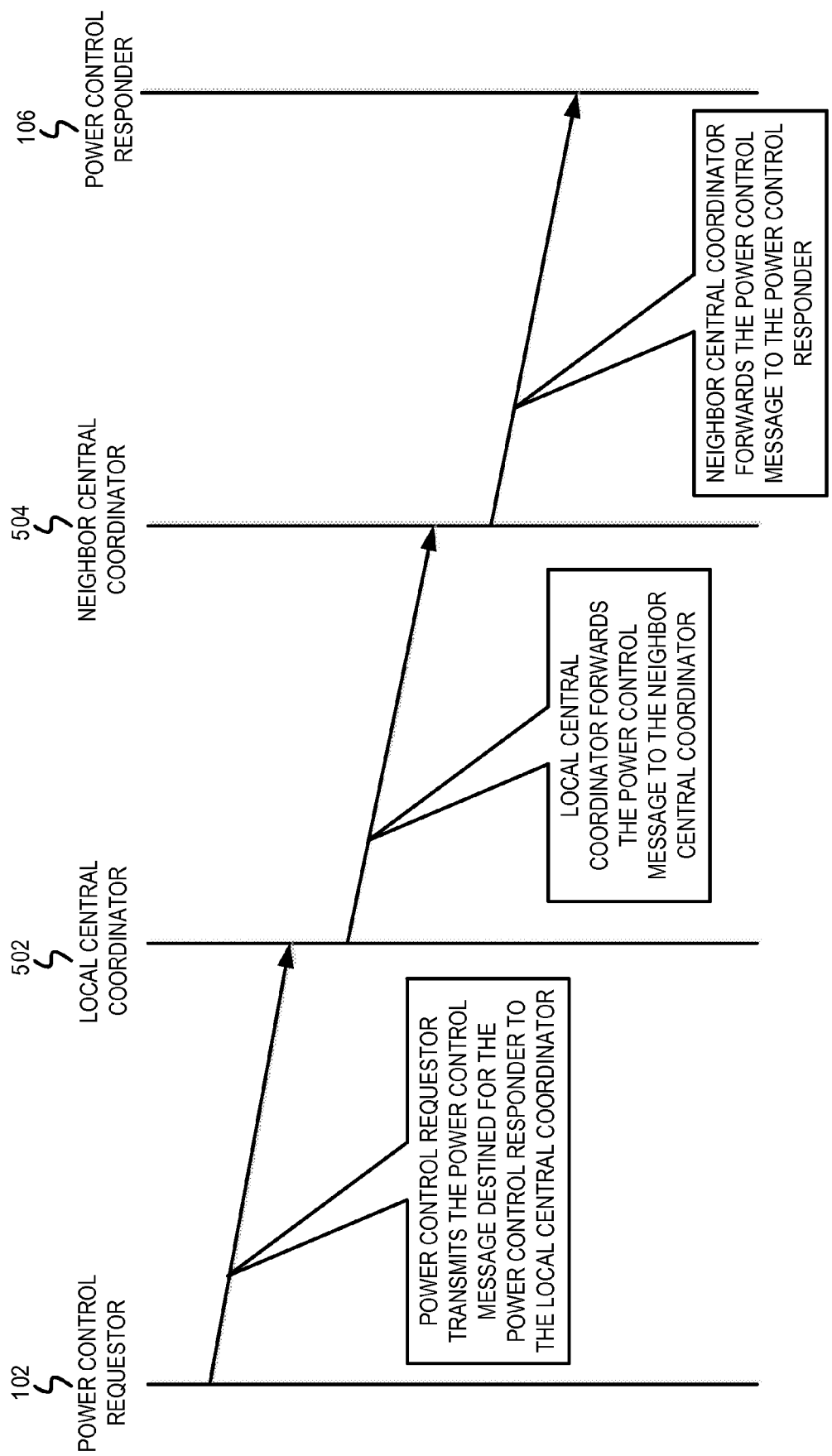
FIG. 5 depicts an indirect power control message dissemination process.

FIG. 5 depicts an indirect power control message dissemination process. In FIG. 5, the power control requestor 102 can transmit the power control message to a central coordinator 502 of the local communication network 100 ("local central coordinator"). The local central coordinator 502 can then forward the power control message to a central coordinator 504 of the neighbor communication network 150 ("neighbor central coordinator"). The neighbor central coordinator 504, in turn, can forward the power control message to the appropriate power control responder 106. In some embodiments, the local central coordinator 502 can compress the power control messages to be forwarded to the neighbor communication network 150. When the local central coordinator 502 receives multiple power control messages destined for the same power control responder, the local central coordinator 502 can compress the multiple power control messages by only forwarding one of the power control messages that includes a least preferred performance measurement. For example, the local central coordinator 502 may forward one of the power control messages that includes the smallest link margin. In some embodiments, the local central coordinator 502 can transmit all the power control messages (without compression) to the neighbor central coordinator 504. However, for each power control responder in the neighbor communication network 150, the neighbor central coordinator 504 may only forward one of the power control messages that includes a least preferred performance measurement. For example, for each power control responder in the neighbor communication network 150, the neighbor central coordinator 504 may forward one power control message that includes the smallest link margin. In some embodiments, the local central coordinator 502 can forward the power control messages to the neighbor central coordinator 504 at predetermined periodic time intervals. In some embodiments, the local central coordinator 502 can forward the power control messages to the neighbor central coordinator 504 using predetermined/reserved management messages. In other embodiments, the local central coordinator 502 can forward the power control messages to the neighbor central coordinator 504 by piggybacking the power control messages onto beacon messages or other suitable messages.

Figure 6:
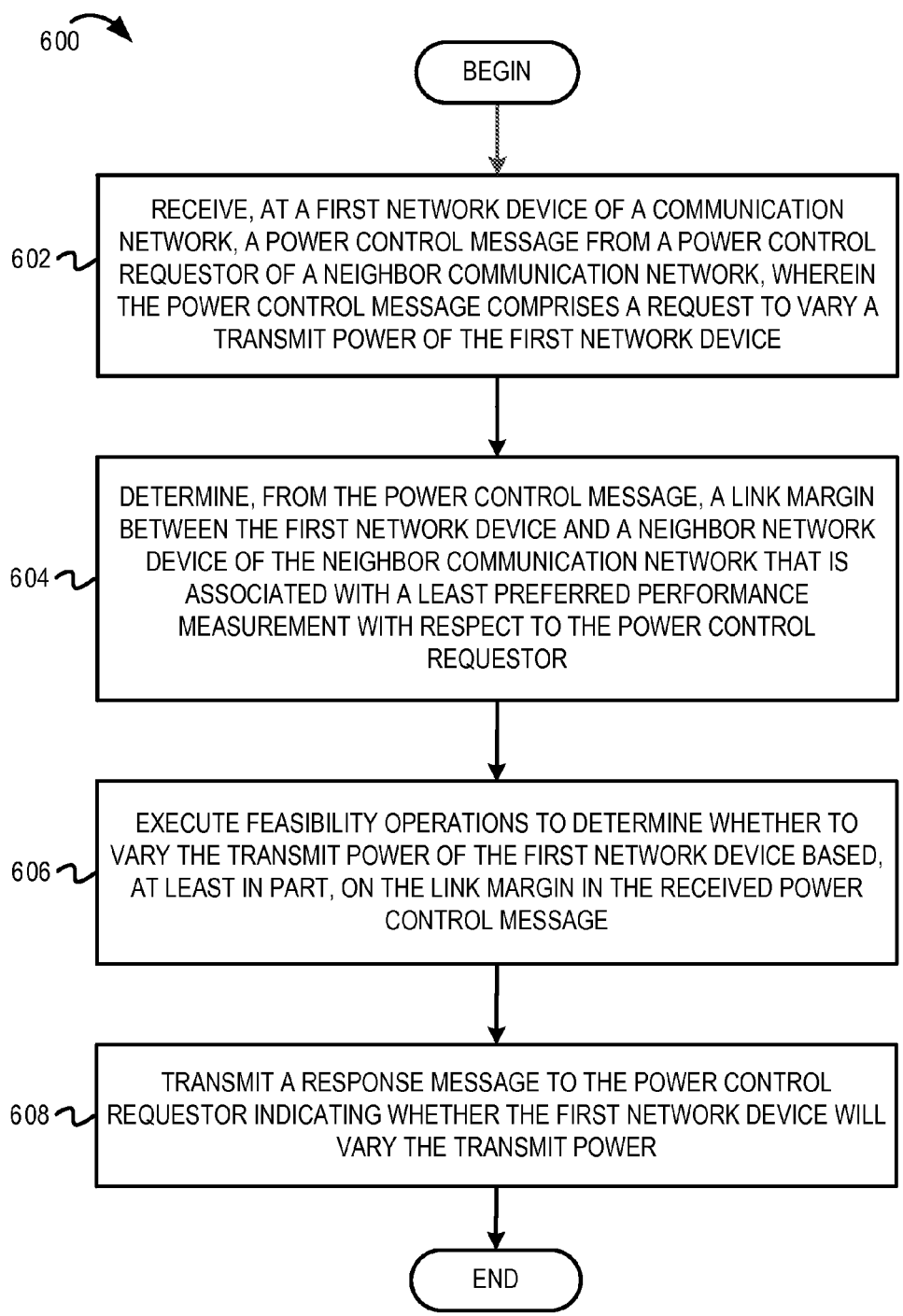
FIG. 6 is a flow diagram illustrating example transmit power control operations of a power control responder.

FIG. 6 is a flow diagram 600 illustrating example transmit power control operations of a power control responder. The flow 600 begins at block 602.

At block 602, a first network device of a communication network receives a power control message from a power control requestor of a neighbor communication network. With reference to the example of FIG. 1, the power control responder 106 can receive a power control message from the power control requestor 102. The power control message includes a request to vary a transmit power of the power control responder 106. The flow continues at block 604.

At block 604, a link margin between the first network device and a neighbor network device associated with a least preferred performance measurement is determined from the power control message. As discussed above with reference to FIGS. 3 and 4, the power control message can include an identifier of the weakest transmitting device 104 in the communication network 100 of the power control requestor 102. The power control message can also include a link margin between the power control responder 106 and the weakest transmitting device 104 in the communication network 100 of the power control requestor 102. The flow continues at block 606.

At block 606, the first network device executes feasibility operations to determine whether to vary the transmit power of the first network device based, at least in part, on the link margin in the received power control message. As will be further described with reference to FIG. 7, the power control unit 116 of the power control responder 106 can determine whether the transmit power of the power control responder 106 can be decreased without negatively affecting the performance of other network devices 108 in the communication network 150 of the power control responder 106. For example, the power control responder 106 can identify a network device 108 that is associated with the least preferred performance measurement in its local communication network 150. The power control responder 106 can determine a performance measurement between the network device with the least preferred performance measurement in the communication networks 100 and 150. The power control responder 106 can use this performance measurement and the received link margin to determine whether reducing the transmit power will affect the performance of its local communication network 150. The flow continues at block 608.

At block 608, a response message is transmitted to the power control requestor indicating whether the first network device will vary the transmit power. For example, after executing the feasibility operations, the power control responder 106 can transmit an acknowledgement (ACK) message or a negative acknowledgement (NACK) message to indicate whether the power control responder 106 will reduce its transmit power. As will be further described with reference to FIG. 7, if the power control responder 106 (and its communication network 150) passes the feasibility test, the power control responder 106 can reduce its transmit power by the link margin indicated in the received power control message. The power control responder 106 may then reuse the communication channel with the power control requestor 102. However, if the power control responder 106 (and its communication network 150) fails the feasibility test, the power control responder 106 may maintain its current transmit power and may share the communication channel with the power control requestor 102. From block 608, the flow ends.

Figure 7:
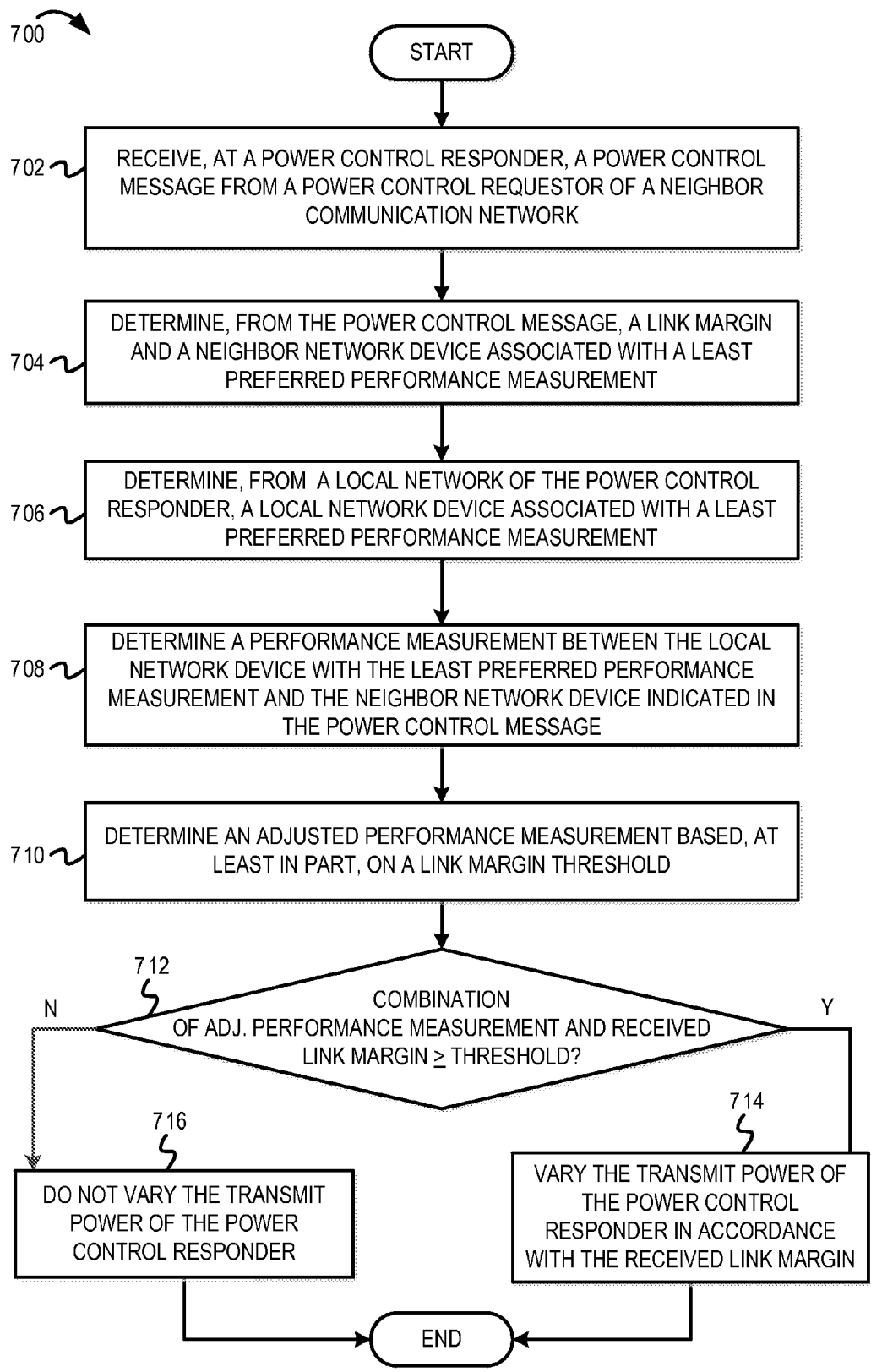
FIG. 7 is a flow diagram illustrating example operations of a power control responder executing feasibility operations.

FIG. 7 is a flow diagram 700 illustrating example operations of a power control responder executing feasibility operations. The flow 700 begins at block 702.

At block 702, a power control responder of a communication network receives a power control message from a power control requestor of a neighbor communication network. With reference to the example of FIG. 1, the power control responder 106 of a local communication network 150 can receive a power control message from the power control requestor 102 of a neighbor communication network 100. The power control message can be a request to vary a transmit power of the power control responder 106. The flow continues at block 704.

At block 704, a link margin and a neighbor network device associated with a least preferred performance measurement is determined from the power control message. As described above with reference to FIGS. 3 and 4, the power control requestor 102 can identify a network device 104 associated with a least preferred performance measurement in the communication network 10 of the power control requestor 102. From the power control message, the power control responder 106 can determine an identifier of the neighbor network device 104 that has the least preferred performance measurement in the neighbor communication network 100. The power control message can also include a link margin between the power control responder 106 and the neighbor network device 104 (with the least preferred performance measurement). The flow continues at block 706.

At block 706, a local network device associated with a least preferred performance measurement is determined from a local communication network of the power control responder. For example, the power control responder 106 can determine that the network device 108 (within its local communication network 150) has the least preferred performance measurement. The performance estimation unit 114 may identify the local network device 108 associated with the highest signal attenuation, the lowest signal strength, the highest error rate, the lowest SNR, and/or another suitable least preferred performance measurement. In some embodiments, each network device in the communication network 150 can periodically identify another network device (in the same communication network 150) with the least preferred performance measurement. For example, the power control responder 106 can periodically determine that the network device 108 received a signal from the power control responder 106 with the highest signal attenuation, the lowest RSSI, or another suitable least preferred performance measurement. When the network device 106 receives a power control message, the power control unit 116 can access previously recorded information to identify the local network device 108 with the highest signal attenuation in the communication network 150. The flow continues at block 708.

At block 708, a performance measurement between the local network device with the least preferred performance measurement ("weakest local receiver") and the neighbor network device indicated in power control message is determined. With reference to FIG. 1, the power control responder 106 can request the weakest local receiver 108 to measure the performance measurement between the weakest local receiver 108 and the neighbor network device 104 (indicated in the power control message). For example, the power control unit 116 can request the weakest local receiver 108 to measure a signal attenuation (or a signal strength) of a signal transmitted by the neighbor network device 104 and received by the weakest local receiver 108.

In some embodiments, the weakest local receiver 108 can track the performance measurement associated with each of the network devices 102 and 104 in the neighbor communication network 100. When the power control responder 106 queries the weakest local receiver 108 for the performance measurement between the weakest local receiver 108 and the neighbor network device 104, the weakest local receiver 108 can transmit an appropriate previously recorded performance measurement to the power control responder 106.

In another embodiment, the weakest local receiver 108 can determine the performance measurement to the neighbor network device 104 in an on-demand manner. For example, the weakest local receiver 108 may receive a query from the power control responder 106 for a performance measurement between the weakest local receiver 108 and the neighbor network device 104. In response to this query, the weakest local receiver 108 can start to estimate the performance measurement based on messages (e.g., a start of frame delimiter, an acknowledgement delimiter, etc.) transmitted from the neighbor network device 104 and received at the weakest local receiver 108.

In other embodiments, the weakest local receiver 108 can track the performance measurement associated with a subset of neighbor network devices of the neighbor communication network 100. For example, the weakest local receiver 108 can periodically determine the performance measurement between the weakest local receiver 108 and a predetermined number of neighbor network devices that are associated with a weakest interference level. For example, the weakest local receiver 108 can periodically determine the performance measurement between the weakest local receiver 108 and N neighbor network devices with the lowest RSSI. The weakest local receiver 108 may receive a query (from the power control responder 106) for a performance measurement between the weakest local receiver 108 and the neighbor network device 104. In response to this query, the weakest local receiver 108 can determine whether the neighbor network device 104 is one of the neighbor network devices that is being tracked. If so, the weakest local receiver 108 can provide the previously recorded performance measurement between the weakest local receiver 108 and the neighbor network device 104. Otherwise, the weakest local receiver 108 can start to estimate the performance measurement based on messages transmitted from the neighbor network device 104 and received at the weakest local receiver 108.

In some embodiments, the power control responder 106 may not use the performance measurement between the neighbor network device 104 and the weakest local receiver 108 to evaluate power control feasibility. Instead, the power control responder 106 can request the weakest local receiver 108 to indicate the weakest interference level detected by the weakest local receiver 108 from any neighbor network device (i.e., not necessarily the neighbor network device 104 indicated in the power control message). For example, the power control responder 106 can request the weakest local receiver 108 to indicate the lowest signal strength (or highest signal attenuation) detected from any neighbor network device of the neighbor communication network 100. The power control responder 106 can use this weakest interference level to execute the feasibility operations, described below. The flow continues at block 710.

At block 710, an adjusted performance measurement is determined based, at least in part, on a link margin threshold. For example, the power control unit 116 can determine the adjusted performance measurement by subtracting the link margin threshold from the performance measurement determined at block 708. For example, the power control unit 116 may determine a signal attenuation between the weakest local receiver 108 and the neighbor network device 104 indicated in the power control message. The power control unit 116 can determine an adjusted signal attenuation by subtracting the link margin threshold from the signal attenuation between the weakest local receiver 108 and the neighbor network device 104. In other embodiments, the power control unit 116 can determine the adjusted performance measurement based, at least in part, on a suitable combination of the performance measurement and the link margin threshold. In some embodiments, the link margin threshold employed at bock 710 may be the same as the first link margin threshold used by the power control requestor 102 to calculate the adjusted link margin in FIGS. 2-4. In other embodiments, the link margin threshold employed at bock 710 may different from the first or the second link margin thresholds used by the power control requestor 102 in FIGS. 2-4. The flow continues at block 712.

At block 712, it is determined whether the combination of the adjusted performance measurement and the received link margin is greater than or equal to a predetermined threshold. In one example, the power control unit 116 can determine whether the sum of the adjusted performance measurement and the received link margin is greater than or equal to zero. If this condition is satisfied, the power control unit 116 can infer that the feasibility test was passed. The power control unit 116 can determine that reducing the transmit power of the power control responder 106 by the received link margin and transmitting subsequent messages at the reduced transmit power will not affect the performance of the weakest local receiver 108. In general, if this condition is satisfied, the power control unit 116 can determine that reducing the transmit power by the received link margin will not cause performance degradation in the communication network 150. If the combination of the adjusted performance measurement and the received link margin exceeds the predetermined threshold, the flow continues at block 714. Otherwise, the flow continues at block 716.

At block 714, it is determined to vary the transmit power of the power control responder in accordance with the received link margin. For example, after passing the feasibility test, the power control unit 116 determines to vary the transmit power of the power control responder 106 by the link margin indicated in the received power control message. The power control responder 106 can also transmit a message (e.g., an acknowledgement message) to the power control requestor 102 to indicate that the transmit power of the power control responder 106 will be varied in accordance with the received link margin. In one example, if the link margin received in the power control message has a negative value, the power control responder 106 can decrease its current transmit power by the link margin. If the link margin received in the power control message has a positive value, the power control responder 106 can increase its current transmit power by the link margin. From block 714, the flow ends.

At block 716, it is determined not to vary the transmit power of the power control responder. In some embodiments, if the power control responder 106 does not pass the feasibility test, the power control unit 116 determines not to reduce the transmit power of the power control responder 106. The power control responder 106 can transmit a message (e.g., a negative acknowledgement message) to the power control requestor 102 to indicate that the transmit power of the power control responder 106 will not be reduced. In another embodiment, however, if the power control responder 106 does not pass the feasibility test, the power control responder 106 can determine whether to reduce its transmit power by another suitable power level (not equal to the received link margin). If so, the power control responder 106 can notify the power control requestor 102 that the transmit power will be reduced by another suitable power level. In some embodiments, if the power control responder 106 determines not to vary the transmit power (e.g., by the link margin or by another suitable value), the power control responder 106 may maintain a current transmit power. In other embodiments, if the power control responder 106 determines not to vary the transmit power, the power control responder 106 may reset its transmit power, transmit at a maximum transmit power, and accordingly notify the power control requestor 102. From block 716, the flow ends.

Although FIG. 7 describes the weakest local receiver 108 tracking the performance measurement to the neighbor network devices 102 and 106, embodiments are not so limited. In other embodiments, each network device 102, 104, 106, and 108 can identify a weakest local receiver in its respective local communication network. Each network device 102, 104, 106, and 108 can also track the performance measurement of network devices in a neighbor communication network, as described above in FIG. 7.

In some embodiments, transmit power control operations (described in the FIGS. 1-7) can be executed periodically between a pair of neighbor communication networks 100 and 150. In some implementations, a power control requestor 102 in the communication network 100 may asynchronously transmit the power control messages to the appropriate power control responders in the communication network 150. In other implementation, the power control requestor 102 may transmit the power control messages to the appropriate power control responders in a synchronous manner during a common time interval. Likewise, the power control responders may service the power control messages during the same time interval, as will be further described with reference to FIG. 8.

Figure 8:
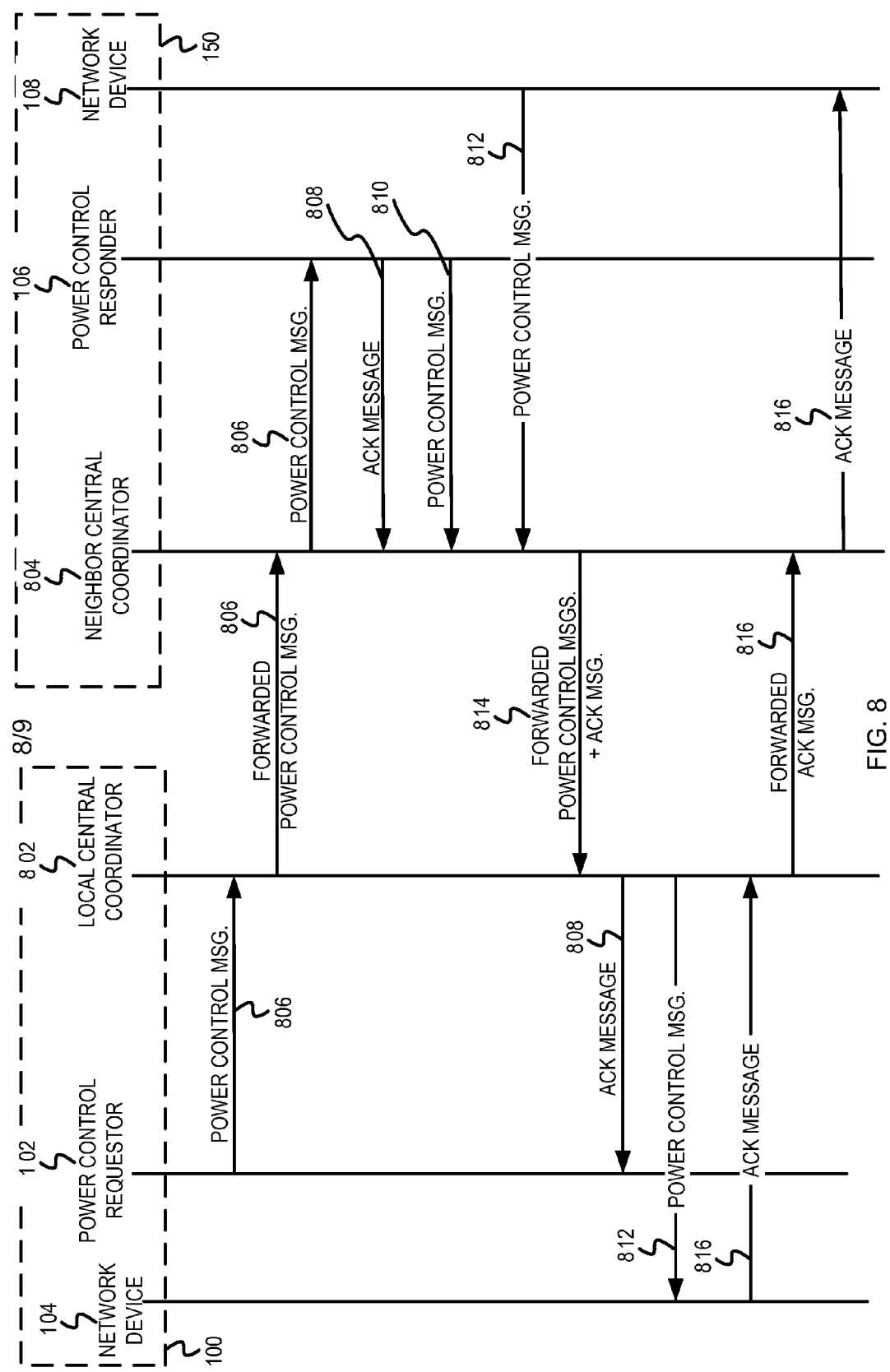
FIG. 8 is a timing diagram illustrating example operations for synchronized transmit power control.

In some embodiments, as previously described with reference to FIG. 5, the power control messages may be forwarded (from a power control requestor 102 to a power control responder 106) via a local central coordinator 802 and a neighbor central coordinator 804. Referring to FIG. 8, the power control requestor 102 can initiate the synchronous power control operations by transmitting a power control message 806 to the local central coordinator 802. The other local network devices 104 can detect or "overhear" the power control message 806 transmitted by the power control requestor 102. This overheard power control message 806 can serve as a trigger for the other local network devices 104 to initiate power control operations at the local network devices 104. For example, in response to detecting the power control message 806 transmitted by the power control requestor 102, the network device 104 can determine whether to transmit a power control message to a neighbor network device. If so, the network device 104 can generate and transmit a power control message to the local central coordinator 802. In some embodiments, the local central coordinator 802 can wait for a predetermined interval (after receiving a power control message 806) to receive additional power control messages from other local network devices. In one example as depicted in FIG. 8, the local network device 104 determines not to transmit a power control message to any of neighbor network devices 106 and 108. After the predetermined interval elapses, the local central coordinator 802 can forward the power control message 806 to the neighbor central coordinator 804. In some embodiments, as discussed above in FIG. 5, the local central coordinator 802 can compress and combine the power control messages destined for a common neighbor network device. The local central coordinator 802 can forward the compressed power control messages to the neighbor central coordinator 804. In other embodiments, however, the local central coordinator 802 can transmit all the power control messages (without compression) to the neighbor central coordinator 804.

After the neighbor central coordinator 804 receives the power control messages, the neighbor central coordinator 804 can forward each power control message to the corresponding power control responder in the network 150. In the example of FIG. 8, the neighbor central coordinator 804 forwards the power control message 806 to the power control responder 106. After receiving the power control message 806, the power control responder 106 can execute feasibility operations (described above in FIGS. 6 and 7) to determine whether to reduce its transmit power. After executing the feasibility operations, the power control responder 106 can transmit an appropriate power control response to the neighbor central coordinator 804. Furthermore, each of the network devices 106 and 108 in the communication network 150 can also evaluate whether to transmit a power control message to a network device in the communication network 100. As depicted in FIG. 8, the power control responder 106 generates an ACK message 808 to indicate that the power control responder 106 will vary its transmit power. In addition, the power control responder 106 also generates a power control message 810 destined for the network device 104. The power control responder 106 transmits the ACK message 808 and the power control message 810 to the neighbor central coordinator 804. The transmitted ACK message 808 and/or the power control message 810 can serve as a trigger to prompt the network device 108 to evaluate whether to transmit a power control message to a network device of the communication network 100. In the example of FIG. 8, the network device 108 determines to transmit a power control message 812 to the network device 104 and transmits the power control message 812 to the neighbor central coordinator 804.

The neighbor central coordinator 804 combines the received power control messages 810 and 812 and the power control response 808. The neighbor central coordinator 804 forwards the combined message 814 to the local central coordinator 802. As discussed above, in some embodiments, because the power control messages 810 and 812 are both destined for the same network device 104, the neighbor central coordinator 804 may compress the power control messages 810 and 812. The neighbor central coordinator 804 may forward one of the power control messages that includes the smallest link margin. In other embodiments, the neighbor central coordinator 804 may not compress the power control messages. The neighbor central coordinator 804 may forward the power control messages 810 and 812 and the power control response 808 to the local central coordinator 802.

In response to receiving the combined forwarded message 814 from the neighbor central coordinator 804, the local central coordinator 802 can forward the power control messages and the power control response to the appropriate network device 102 and 104. In the example of FIG. 8, the local central coordinator 802 forwards the power control response 808 to the power control requestor 102. The local central coordinator 802 forwards the power control message 812 to the network device 104. In some embodiments, if the local central coordinator 802 receives multiple power control messages 810 and 812 destined for the network device 104, the local central coordinator 802 can forward all the power control messages 810 and 812 destined for the network device 104. In other embodiments, as depicted in FIG. 8, the local central coordinator 802 may forward one of the power control messages 812 that includes the smallest link margin. In the example of FIG. 8, the network device 104 executes feasibility operations, determines to vary its transmit power, and transmits an ACK message 816 to the local central coordinator 802. The local central coordinator 802 forwards the ACK message 816 to the neighbor central coordinator 804 which, in turn, forwards the ACK message 816 to the network device 108.

It should be understood that FIGS. 1-8 are examples meant to aid in understanding embodiments and should not be used to limit embodiments or limit scope of the claims. Embodiments may comprise additional components, different components, and/or may perform additional operations, fewer operations, operations in a different order, operations in parallel, and some operations differently. In some embodiments, the transmit power control operations described herein can be used in conjunction with enhanced carrier sense multiple access (CSMA) or other suitable protocols for enabling efficient channel reuse between neighbor communication networks. In general, the transmit power control operations can be used in any suitable environment where coordinated reduction of transmit power can improve performance of communication networks.

In some embodiments, as described above in FIGS. 5 and 8, the local communication network 100 and the neighbor communication network 150 can comprise a dedicated local central coordinator and neighbor central coordinator, respectively. Each central coordinator can be configured to compress (if needed) and forward power control messages and power control responses to/from the network devices in the corresponding communication network. However, in other embodiments, the local communication network 100 and/or the neighbor communication network 150 may not comprise a dedicated central coordinator. For example, one of the network devices in the local communication network 100 (e.g., the network device 102) may operate as the local central coordinator. In addition to executing the transmit power control operations described herein, the network device 102 may also be configured to receive power control messages from other local network devices, compress the power control messages (if needed), and forward the power control messages to the neighbor central coordinator. The network device 102 may also receive forwarded power control messages and power control responses from the neighbor central coordinator and may disseminate these power control messages/response in the local communication network 100. Similarly, the neighbor communication network 150 may not comprise a dedicated neighbor central coordinator. Instead, a network device of the neighbor communication network 150 may be configured to execute the operations of the neighbor central coordinator.

Although the Figures describe the power control requestor 102 transmitting the link margin (between the weakest local transmitter 104 and a neighbor network device 106) to the neighbor network device 106, embodiments are not so limited. In other embodiments, each of the local network devices can determine a link margin between it and a suitable number of neighbor network devices. The link margin information determined by all the local network devices 102 and 104 can be transmitted to the neighbor network devices 106 and 108. In doing so, the local communication network 100 can provide network-wide link margin information to the neighbor communication network 150. The neighbor network devices 106 and 108 may use this network-wide link margin information to determine whether reducing the transmit power will affect any communication link in the neighbor communication network 150. In other embodiments, only some of the local network devices may transmit the link margin information to some of the neighbor network devices, as described above in FIGS. 1-4. The neighbor network devices that receive the link margin information can determine whether to vary their respective transmit power.

In some embodiments, the communication network 100 may have multiple neighbor communication networks. In this embodiment, a network device 102 in the communication network 100 may independently execute the transmit power control operations described above with each of the neighbor communication networks. In some embodiments, a network device 102 may receive power control messages from multiple neighbor communication networks. For each of the multiple neighbor communication networks, the power control requestor 102 may determine whether to increase, decrease, or maintain the transmit power of the network device. The decision regarding whether to increase, decrease, or maintain the transmit power of the network device 102 may be referred to as a "power control decision" of the network device 102. The network device 102 can combine the power control decision made for each of the neighbor communication networks to determine whether to vary the transmit power of the network device 102. For example, the network device 102 may determine to maintain a normal transmit power for transmitting communications to a first neighbor communication network and may determine to reduce the transmit power by 5 dB for transmitting communications to a second neighbor communication network. After combining the power control decisions, the network device may determine to reduce the transmit power by 5 dB (for transmitting communications to both the neighbor communication networks) to help maximize the extent of channel reuse.

In some embodiments, the power control responder 106 of the communication network 150 may not reduce its transmit power by the link margin received from the power control requestor 102. Instead, the power control responder 106 can determine an appropriate power level by which to reduce its transmit power in an attempt to improve overall system performance by reusing the channel and also by using a high transmission data rate. In this embodiment, power control responders can be configured to vary their respective the link margin threshold (described in block 710 of FIG. 7), such that each power control responder detects the same SINR from different network devices in both the communication networks 100 and 150. Different power control responders can be configured to independently vary their respective link margin threshold and to independently adjust their respective transmit power. Each power control responder may adjust its link margin threshold based on the interference level detected on the communication channel by the power control responder, QoS requirements, traffic intensity associated with the power control responder and other network devices in its local communication network. For example, the network devices 102, 104, 106, and 108 can vary their respective transmit power so that the SINR detected at each of the network devices 102, 104, 106, and 108 is approximately the same.

In some embodiments, in response to receiving a power control message, each power control responder can independently determine an appropriate power level by which to reduce its current transmit power. In other embodiments, in response to receiving the power control message, each power control responder may determine the feasibility of reducing its transmit power by the link margin received in the power control message. If reducing the transmit power by the indicated link margin is not feasible, the power control responder can determine whether to reduce its transmit power by a different power level.

In some embodiments, each local network device 102 and 104 can make an individual channel reuse decision that indicates whether the network device should reuse or share the communication channel with the neighbor communication network 150. However, in some embodiments, different local network devices may make conflicting channel reuse decisions. For example, the local network device 102 may determine that it has an acceptable signal-to-interference-plus-noise ratio (SINR) and may determine to reuse the communication channel with the neighbor communication network 150. The local network device 104 may determine that it has a poor SINR and may determine to share the communication channel with the neighbor communication network 150. To ensure that channel reuse does not result in performance degradation, the local network devices 102 and 104 can coordinate their individual channel reuse decisions and determine a coordinated channel reuse decision. For example, if at least one local network device that determines to share the communication channel with the neighbor communication network 150, all the local network devices 102 and 104 can determine to share the communication channel with the neighbor communication network 150. Thus, the local network devices 102 and 104 may defer transmission in response to detecting communications of the neighbor communication network 150. As another example, the local communication network 100 and the neighbor communication network 150 may reuse the channel if all the local network devices determine to reuse the communication channel with the neighbor communication network 150. Furthermore, after executing the power control operations described herein, each local network device and neighbor network device can reevaluate their individual and coordinated channel reuse decisions and determine whether to reuse or share the channel between the communication networks 100 and 150.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
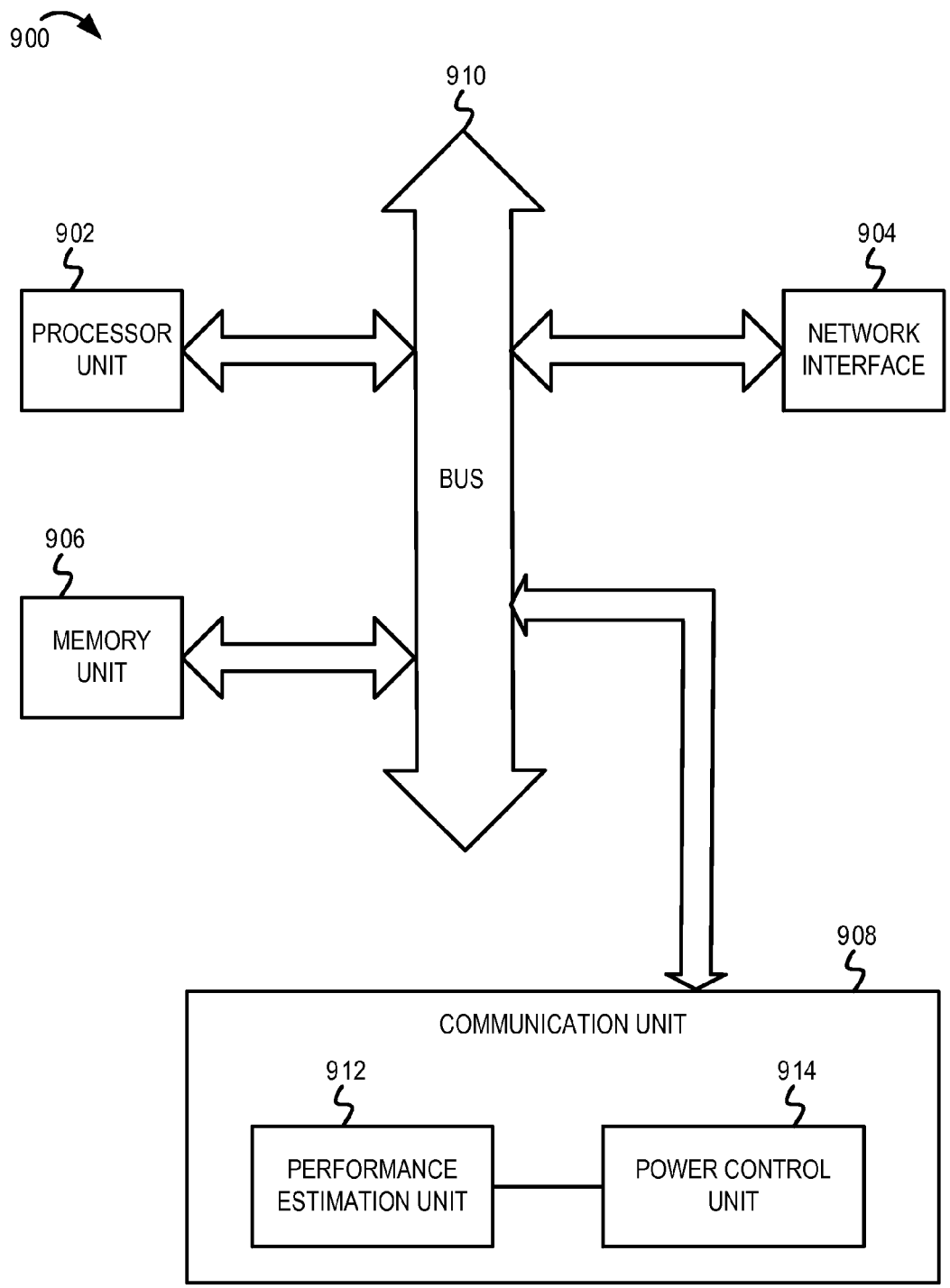
FIG. 9 is a block diagram of an electronic device including a mechanism for transmit power control.

FIG. 9 is a block diagram of one embodiment of an electronic device 900 including a mechanism for adaptive transmit power control in a communication network. In some implementations, the electronic device 900 may be one of a desktop computer, laptop computer, a tablet computer, a mobile phone, a smart appliance, a powerline communication device, a gaming console, a network bridging device, an access point, or other electronic system comprising a communication unit configured to communicate across one or more communication networks. The electronic device 900 includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer readable storage media. The electronic device 900 also includes a bus 910 (e.g., PCI, ISA, PCI-Express, HyperTransport®, InfiniBand®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 900 can comprise a plurality of network interfaces—each of which couples the electronic device 900 to a different communication network. For example, the electronic device 900 can comprise a PLC interface, an Ethernet interface, and a WLAN interface that couple the electronic device 900 with a powerline communication network, an Ethernet, and a wireless local area network respectively. Furthermore, in some embodiments, the electronic device 900 can execute an IEEE Std. 1905.1 protocol for implementing hybrid communication functionality.

The electronic device 900 also includes a communication unit 908. The communication unit 908 comprises a performance estimation unit 912 and a power control unit 914. As described above in FIGS. 1-5 and 8, the power control unit 914 can identify a weakest local transmitter in the local communication network of the electronic device 900. The power control unit 914 can calculate a link margin between the weakest local transmitter and a neighbor network device. The power control unit 914 can transmit a power control message including the link margin to prompt the neighbor network device to reduce its transmit power. As described above in FIGS. 6-8, if the electronic device 900 receives a power control message, the power control unit 914 can use the link margin indicated in the received power control message to evaluate the feasibility of reducing the transmit power of the electronic device 900.

Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. In some embodiments, the communication unit 908 can each be implemented on a system-on-a-chip (SoC), an application specific integrated circuit (ASIC), or another suitable integrated circuit to enable communications of the electronic device 900. In some embodiments, the communication unit 908 may comprise additional processors and memory, and may be implemented in one or more integrated circuits on one or more circuit boards of the electronic device 900. In some embodiments, the communication unit 908 and/or the network interface 904 can include one or more radio transceivers, dedicated processors, memory, and other logic to implement the communication protocols and related transmit power control functionality described herein. Further, realizations may include fewer or additional components not illustrated in FIG. 9 (e.g., video cards, audio cards, additional network interfaces, peripheral devices, etc.). For example, in addition to the processor unit 902 coupled with the bus 910, the communication unit 908 may comprise at least one additional processor unit. The processor unit 902, the memory unit 906, and the network interfaces 904 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, techniques for adaptive transmit power control as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for adaptive transmit power control in a communication network, the method comprising:

identifying, at a first network device of a local communication network, a second network device of the local communication network that is associated with a first performance measurement;

determining, at the first network device, a link margin between the second network device and a neighbor network device of a neighbor communication network based, at least in part, on the first performance measurement and a second performance measurement of the neighbor network device;

determining to transmit a first power control message from the first network device to request the neighbor network device to vary a transmit power, based, at least in part, on the link margin;

receiving, at the first network device, a response message from the neighbor network device indicating whether the neighbor network device will reduce the transmit power; and determining whether to reuse or share a common communication channel between the local communication network and the neighbor communication network based, at least in part, on whether the neighbor network device will reduce the transmit power.

2. The method of claim 1, wherein each of the first performance measurement and the second performance measurement is at least one member of the group consisting of a received signal strength indicator (RSSI) value, a signal strength level, a signal attenuation level, and an error rate.

3. The method of claim 1, wherein the neighbor network device is one a network device of the neighbor communication network that is associated with a highest interference level.

4. The method of claim 1, wherein said determining the link margin between the second network device and the neighbor network device comprises:
  determining a difference between the first performance measurement and the second performance measurement; and
  determining the link margin between the second network device and the neighbor network device based, at least in part, on the difference.

5. The method of claim 1, wherein said determining to transmit the first power control message comprises:
  determining whether the link margin is less than a first margin threshold;
  in response to determining that the link margin is less than the first threshold,
    determining an adjusted link margin based, at least in part, on combining the first threshold and the link margin; and
    transmitting the first power control message including the adjusted link margin to the neighbor network device.

6. The method of claim 5, wherein, in response to determining that the link margin is greater than the first threshold, the method further comprises:
  determining whether the link margin is greater than a second threshold and whether the neighbor network device has previously reduced the transmit power;
  in response to determining that the link margin is greater than the second threshold and that the neighbor network device has previously reduced the transmit power,
    determining the adjusted link margin based, at least in part, on combining the first threshold and the link margin; and
    transmitting the first power control message including the adjusted link margin to the neighbor network device.

7. The method of claim 6, further comprising:
  determining that the link margin is equal to the second threshold and that the neighbor network device has previously reduced the transmit power;
  determining the adjusted link margin based, at least in part, on combining the first threshold and the link margin; and
  transmitting the first power control message including the adjusted link margin to the neighbor network device.

8. The method of claim 1, further comprising,
  transmitting the first power control message to the neighbor network device.

9. The method of claim 1, wherein, in response to determining that the neighbor network device will not reduce the transmit power, the method further comprises:
  transmitting a notification to the second network device to cause the second network device to maintain a power level of the second network device; and
  determining to share the common communication channel by deferring one or more transmissions of the first network device in response to detecting communications of the neighbor communication network.

10. The method of claim 1, wherein, in response to determining that the neighbor network device will not reduce the transmit power, the method further comprises:
  transmitting a notification to the second network device to cause the second network device to operate at a maximum power level of the second network device; and
  determining to share the common communication channel with the neighbor communication network by deferring one or more transmissions of the first network device in response to detecting communications of the neighbor communication network.

11. The method of claim 1, wherein, in response to determining that the neighbor network device will not reduce the transmit power, the method further comprises:
  determining to share the common communication channel by deferring transmissions of the first network device in response to detecting communications of the neighbor communication network; and
  notifying the second network device to share the common communication channel with the neighbor communication network.

12. The method of claim 1, wherein, in response to determining that the neighbor network device will reduce the transmit power, the method further comprises:
  determining to reuse the common communication channel by initiating transmissions of the first network device.

13. The method of claim 1, wherein the first power control message comprises the link margin and an identifier of the second network device.

14. The method of claim 1, wherein, in response to determining to transmit the first power control message to the neighbor network device, the method further comprises:
  transmitting the first power control message to a first central coordinator of the local communication network to cause the first central coordinator to forward the first power control message to the neighbor network device via a second central coordinator of the neighbor communication network.

15. The method of claim 1, wherein, if the first network device is a central coordinator of the local communication network, the method further comprises:
  receiving, at the central coordinator, a second power control message destined for the neighbor network device; and
  forwarding, to the neighbor network device, the first power control message or the second power control message that includes another link margin.

16. The method of claim 1, further comprising:
  transmitting the first power control message to a central coordinator of the local communication network, in response to determining that a third network device of the local communication network transmitted a second power control message destined for the neighbor communication network to the central coordinator.

17. A method for adaptive transmit power control in a communication network, the method comprising: receiving, at a first network device of a local communication network, a power control message from a first neighbor network device of a neighbor communication network, wherein the power control message comprises a request to vary a transmit power of the first network device; determining, from the power control message, a link margin between the first network device and a second neighbor network device of the neighbor communication network, wherein the second neighbor network device is associated with a first performance measurement of the first neighbor network device; identifying a second network device of the local communication network that is associated with a second performance measurement of the first network device; determining a third performance measurement of a communication link between the second network device and the second neighbor network device; determining whether to vary the transmit power of the first network device based, at least in part, on the third performance measurement and the link margin; transmitting a response message to the first neighbor network device indicating whether the first network device will vary the transmit power; and determining whether to reuse or share a common communication channel between the local communication network and the neighbor communication network based, at least in part, on whether the first network device will vary the transmit power.

18. The method of claim 17, wherein the power control message comprises an identifier of the second neighbor network device and the link margin.

19. The method of claim 17, further comprising:
determining a fourth performance measurement based, at least in part, on combining a first threshold and the third performance measurement, wherein determining whether to vary the transmit power of the first network device is based on the fourth performance measurement and the link margin.

20. The method of claim 19, wherein said determining whether to vary the transmit power comprises:
determining whether a combination of the fourth performance measurement and the link margin is greater than a second threshold; and
in response to determining that the combination of the adjusted fourth performance measurement and the link margin is greater than the second threshold,
determining to vary the transmit power by the link margin.

21. The method of claim 20, further comprising:
in response to determining that the combination of the fourth performance measurement and the link margin is less than the second threshold, determining not to vary the transmit power.

22. The method of claim 20, further comprising:
in response to determining that the combination of the fourth performance measurement and the link margin is equal to the second threshold,
determining to vary the transmit power by the link margin.

23. The method of claim 17, wherein said identifying the second network device comprises:
periodically determining a respective fourth performance measurement between the first network device and network devices of the local communication network to identify the second network device.

24. The method of claim 17, wherein, in response to determining to vary the transmit power,
if the link margin is a negative value, decreasing the transmit power by the link margin; and
if the link margin is a positive value, increasing the transmit power by the link margin.

25. The method of claim 17, further comprising:
determining not to reduce the transmit power by the link margin; and
determining, at the first network device, whether to reduce the transmit power by an alternate power level.

26. The method of claim 25, wherein, in response to determining to reduce the transmit power by the alternate power level,
the response message further indicates the alternate power level.

27. The method of claim 17, further comprising:
varying the transmit power of the first network device, such that performance measurements of network devices of the local communication network are approximately equal to respective performance measurements of network devices of the neighbor communication network.

28. The method of claim 17, further comprising:
varying the transmit power, such that a performance measurement of the first network device is approximately equal to a performance measurement of the first neighbor network device.

29. The method of claim 17, wherein said transmitting the response message to the first neighbor network device comprises:
transmitting the response message to a first central coordinator of the local communication network to cause the first central coordinator to forward the response message to the first neighbor network device via a second central coordinator of the neighbor communication network.

30. The method of claim 17, further comprising:
periodically determining a respective fourth performance measurement between the first network device and network devices of the neighbor communication network.

31. A first network device comprising:
a processor; and
a power control unit coupled with the processor, the power control unit configured to:
identify a second network device of a local communication network that is associated with a first performance measurement, wherein the local communication network comprises the first network device;
determine a link margin between the second network device and a neighbor network device of a neighbor communication network based, at least in part, on the first performance measurement and a second performance measurement of the neighbor network device;
determine to transmit a power control message from the first network device to request the neighbor network device to vary a transmit power, based, at least in part, on the link margin;
receive a response message from the neighbor network device indicating whether the neighbor network device will reduce the transmit power; and
determine whether to reuse or share a common communication channel between the local communication network and the neighbor communication network based, at least in part, on whether the neighbor network device will reduce the transmit power.

32. The first network device of claim 31, wherein the power control unit is further configured to:
determine whether the link margin is less than a first threshold;
in response to determining that the link margin is less than the first threshold,
determine an adjusted link margin based, at least in part, on combining the first threshold and the link margin; and
transmit the power control message including the adjusted link margin to the neighbor network device.

33. The first network device of claim 32, wherein, in response to
determining that the link margin is greater than the first threshold, the power control unit is further configured to:
determine whether the link margin is greater than a second threshold and whether the neighbor network device has previously reduced the transmit power;
in response to determining that the link margin is greater than the second threshold and that the neighbor network device has previously reduced the transmit power, determine the adjusted link margin based, at least in part, on combining the first threshold and the link margin; and transmit the power control message including the adjusted link margin to the neighbor network device.

34. The first network device of claim 31, further comprising:

transmitting the power control message to the neighbor network device.

35. The first network device of claim 34, wherein, in response to determining that the neighbor network device will not reduce the transmit power, the power control unit is further configured to:

determine to share the common communication channel by deferring transmissions of the first network device in response to detecting communications of the neighbor communication network; and notify the second network device to share the common communication channel with the neighbor communication network.

36. The first network device of claim 34, wherein, in response to determining that the neighbor network device will reduce the transmit power, the power control unit is further configured to:

determine to reuse the common communication channel by initiating transmissions of the first network device.

37. A first network device comprising: a processor; and a power control unit coupled with the processor, the power control unit configured to: receive, at the first network device of a local communication network, a power control message from a first neighbor network device of a neighbor communication network, wherein the power control message comprises a request to vary a transmit power of the first network device of the local communication network; determine, from the power control message, a link margin between the first network device and a second neighbor network device of the neighbor communication network, wherein the second neighbor network device is associated with a first performance measurement of the first neighbor network device; identify a second network device of the local communication network that is associated with a second performance measurement of the first network device; determine a third performance measurement of a communication link between the second network device and the second neighbor network device; determine whether to vary the transmit power of the first network device based, at least in part, on the third performance measurement and the link margin; transmit a response message to the first neighbor network device indicating whether the first network device will vary the transmit power; and determine whether to reuse or share a common communication channel between the local communication network and the neighbor communication network based, at least in part, on whether the first network device will vary the transmit power.

38. The first network device of claim 37, wherein the power control unit is further configured to:

determine a fourth performance measurement based, at least in part, on combining a first threshold and the third performance measurement, wherein determine whether to vary the transmit power of the first network device is based on the fourth performance measurement and the link margin.

39. The first network device of claim 38, wherein the power control unit configured to determine whether to vary the transmit power comprises the power control unit configured to:

determine whether a combination of the fourth performance measurement and the link margin is greater than a second threshold; and in response to determining that the combination of the fourth performance measurement and the link margin is greater than the second threshold, determine to vary the transmit power by the link margin.

40. The first network device of claim 39, wherein the power control unit is further configured to:

in response to determining that the combination of the fourth performance measurement and the link margin is less than the second threshold, determine not to vary the transmit power.

41. The first network device of claim 37, wherein the power control unit is further configured to:

determine not to reduce the transmit power by the link margin; and determine whether to reduce the transmit power by an alternate power level.

42. The first network device of claim 37, wherein the power control unit is further configured to:

vary the transmit power of the first network device, such that a performance measurement of the first network device is approximately equal to a performance measurement of the first neighbor network device.

43. A non-transitory machine-readable storage medium having machine executable instructions stored therein, the machine executable instructions comprising instructions to:

identify, at a first network device of a local communication network, a second network device of the local communication network that is associated with a first performance measurement;

determine a link margin between the second network device and a neighbor network device of a neighbor communication network based, at least in part, on the first performance measurement and a second performance measurement of the neighbor network device;

determine to transmit a power control message from the first network device to request the neighbor network device to vary a transmit power, based, at least in part, on the link margin;

receive, at the first network device, a response message from the neighbor network device indicating whether the neighbor network device will reduce the transmit power; and determine whether to reuse or share a common communication channel between the local communication network and the neighbor communication network based, at least in part, on whether the neighbor network device will reduce the transmit power.

44. The non-transitory machine-readable storage medium of claim 43, wherein said instructions to determine whether to transmit the power control message comprise instructions to:

determine whether the link margin is less than a first threshold;

in response to determining that the link margin is less than the first threshold, determine an adjusted link margin based, at least in part, on combining the first and the link margin; and transmit the power control message including the adjusted link margin to the neighbor network device.

45. The non-transitory machine-readable storage medium of claim 44, wherein, in response to determining that the link margin is greater than the first threshold, said instructions further comprise instructions to:

determine whether the link margin is greater than a second threshold and whether the neighbor network device has previously reduced the transmit power;

in response to determining that the link margin is greater than the second threshold and that the neighbor network device has previously reduced the transmit power, determine the adjusted link margin based, at least in part, on combining the first threshold and the link margin; and transmit the power control message including the adjusted link margin to the neighbor network device.

46. The non-transitory machine-readable storage medium of claim 43, wherein said instructions further comprise instructions to transmit the power control message to the neighbor network device.

47. A non-transitory machine-readable storage medium having machine executable instructions stored therein, the machine executable instructions comprising instructions to: receive, at a first network device of a local communication network, a power control message from a first neighbor network device of a neighbor communication network, wherein the power control message comprises a request to vary a transmit power of the first network device; determine, from the power control message, a link margin between the first network device and a second neighbor network device of the neighbor communication network, wherein the second neighbor network device is associated with a first performance measurement of the first neighbor network device; identify a second network device of the local communication network that is associated with a second performance measurement of the first network device; determine a third performance measurement of a communication link between the second network device and the second neighbor network device; determine whether to vary the transmit power of the first network device based, at least in part, on the third performance measurement and the link margin; transmit a response message to the first neighbor network device indicating whether the first network device will vary the transmit power; and determine whether to reuse or share a common communication channel between the local communication network and the neighbor communication network based, at least in part, on whether the first network device will vary the transmit power.

48. The non-transitory machine-readable storage medium of claim 47, wherein said instructions further comprise instructions to:

determine a fourth performance measurement based, at least in part, on combining a first threshold and the performance measurement wherein determining whether to vary the transmit power of the first network device is based on the fourth performance measurement and the link margin.

49. The non-transitory machine-readable storage medium of claim 48, wherein said instructions to determine whether to vary the transmit power comprise instructions to:

determine whether a combination of the fourth performance measurement and the link margin is greater than a second threshold; and in response to determining that the combination of the fourth performance measurement and the link margin is greater than the second threshold, determine to vary the transmit power by the link margin.

50. The non-transitory machine-readable storage medium of claim 47, wherein said instructions further comprise instructions to:

determine not to reduce the transmit power by the link margin; and determine whether to reduce the transmit power by an alternate power level.

51. The non-transitory machine-readable storage medium of claim 47, wherein said instructions further comprise instructions to:

vary the transmit power such that a performance measurement of the first network device is approximately equal to a performance measurement of the first neighbor network device.

* * * * *